US010878386B2

(12) United States Patent
Hoofard et al.

(10) Patent No.: US 10,878,386 B2
(45) Date of Patent: Dec. 29, 2020

(54) SYSTEMS AND METHODS FOR AUTOMATED DOCK STATION SERVICING

(71) Applicant: ASSA ABLOY Entrance Systems AB, Landskrona (SE)

(72) Inventors: Richard K. Hoofard, Dallas, TX (US); Daryl Day, Frisco, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 16/199,729

(22) Filed: Nov. 26, 2018

(65) Prior Publication Data
US 2020/0167734 A1 May 28, 2020

(51) Int. Cl.
*G06Q 10/00* (2012.01)
*B65G 69/28* (2006.01)
*H04L 12/28* (2006.01)

(52) U.S. Cl.
CPC ............ *G06Q 10/20* (2013.01); *B65G 69/28* (2013.01); *H04L 12/2825* (2013.01)

(58) Field of Classification Search
None
See application file for complete search history.

(56) References Cited

U.S. PATENT DOCUMENTS

| 4,009,051 A | 2/1977 | Kazis et al. |
| 4,286,911 A | 9/1981 | Benjamin |
| 4,476,853 A | 10/1984 | Arbogast |
| 4,590,118 A | 5/1986 | Yatabe et al. |
| 4,626,983 A | 12/1986 | Harada et al. |
| 4,661,758 A | 4/1987 | Whittaker |
| 4,744,121 A | 5/1988 | Swessel et al. |
| 4,843,373 A | 6/1989 | Trickle et al. |
| 4,988,254 A | 1/1991 | Alexander |
| 5,026,242 A | 6/1991 | Alexander |

(Continued)

FOREIGN PATENT DOCUMENTS

| DE | 102004037933 B3 | 2/2006 |
| EP | 2215612 B1 | 8/2012 |

(Continued)

OTHER PUBLICATIONS

Dock Lighting Goes Green with the FT Ultra LED Docklight:, APS Resource, News Release. 1 page.

(Continued)

*Primary Examiner* — Daniell L Negron
(74) *Attorney, Agent, or Firm* — Perkins Coie LLP

(57) ABSTRACT

An automatic dock servicing system can monitor status of dock stations and/or dock station components, analyze the status to determine whether it satisfies a service condition for one or more service actions and, when service conditions are satisfied, cause the corresponding service actions to be performed. In some embodiments, a control panel can track a number of trailer loading/unloading cycles at the dock station. When the number of cycles reaches a threshold for performing a service on the dock station, the control panel can automatically initiate the service action. Some service actions that can be initiated by placing a maintenance or part request, sending control signals to a control panel or to dock station components, and/or sending messages or providing remote controls to other personnel.

15 Claims, 12 Drawing Sheets

(56) References Cited

U.S. PATENT DOCUMENTS

| | | | |
|---|---|---|---|
| 5,047,748 A | 9/1991 | Trickle | |
| 5,168,262 A | 12/1992 | Okayama | |
| 5,168,267 A | 12/1992 | Trickle | |
| 5,181,401 A | 1/1993 | Hodan et al. | |
| 5,323,098 A | 6/1994 | Hamaguchi et al. | |
| 5,576,533 A | 11/1996 | Tantraporn | |
| 5,775,107 A | 7/1998 | Sparkman | |
| 5,831,540 A * | 11/1998 | Sullivan | B65G 69/2882 340/679 |
| 5,886,863 A | 3/1999 | Nagasaki et al. | |
| 5,886,883 A | 3/1999 | Rail | |
| 5,898,585 A | 4/1999 | Sirichote et al. | |
| 6,082,952 A | 7/2000 | Alexander | |
| 6,367,259 B1 | 4/2002 | Timm | |
| 6,369,462 B1 | 4/2002 | Siri | |
| 6,390,245 B1 | 5/2002 | Metz et al. | |
| 6,476,572 B2 | 11/2002 | Lounsbury | |
| 6,543,375 B1 | 4/2003 | Sargent et al. | |
| 6,663,527 B2 | 12/2003 | Phelan et al. | |
| 6,781,516 B2 | 8/2004 | Reynard et al. | |
| 6,787,259 B2 | 9/2004 | Colborn et al. | |
| 6,810,817 B1 | 11/2004 | William | |
| 6,812,849 B1 | 11/2004 | Ancel | |
| 6,917,298 B2 | 7/2005 | Romano et al. | |
| 6,972,226 B2 | 12/2005 | Deppe et al. | |
| 6,975,226 B2 | 12/2005 | Reynard et al. | |
| 7,032,720 B2 | 4/2006 | Jette et al. | |
| 7,045,764 B2 | 5/2006 | Beggs et al. | |
| 7,119,673 B2 | 10/2006 | Eager et al. | |
| 7,162,762 B1 | 1/2007 | Gleason | |
| 7,165,486 B2 | 1/2007 | Alexander et al. | |
| 7,230,819 B2 | 6/2007 | Muchow et al. | |
| 7,256,703 B2 | 8/2007 | Duvernell et al. | |
| 7,264,092 B2 | 9/2007 | Jette | |
| 7,274,300 B2 | 9/2007 | Duvernell et al. | |
| 7,333,016 B2 | 2/2008 | Ancel | |
| 7,380,375 B2 | 6/2008 | Maly | |
| 7,730,981 B2 | 6/2010 | McCabe et al. | |
| 7,750,890 B2 | 7/2010 | Fitzgibbon et al. | |
| 7,864,030 B2 | 1/2011 | Jetté et al. | |
| 8,112,949 B2 | 2/2012 | Eungard | |
| 8,286,757 B2 | 10/2012 | Nelson et al. | |
| 8,307,589 B2 | 11/2012 | Eungard et al. | |
| 8,307,956 B2 | 11/2012 | Andersen et al. | |
| 8,345,010 B2 | 1/2013 | Fitzgibbon et al. | |
| 8,407,842 B2 | 4/2013 | Story et al. | |
| 8,490,669 B2 | 7/2013 | Fletcher et al. | |
| 8,497,761 B2 | 7/2013 | McNeill et al. | |
| 8,510,888 B2 | 8/2013 | Eungard | |
| 8,547,234 B2 | 10/2013 | Maly et al. | |
| 8,590,087 B2 | 11/2013 | Swessel et al. | |
| 8,590,674 B2 | 11/2013 | Jette et al. | |
| 8,775,710 B1 | 7/2014 | Miller et al. | |
| 8,893,764 B2 | 11/2014 | Vohla et al. | |
| 9,564,072 B2 | 2/2017 | Senfleben et al. | |
| 2002/0089427 A1 | 7/2002 | Aratani et al. | |
| 2003/0167238 A1 | 9/2003 | Zeif et al. | |
| 2005/0102042 A1 | 5/2005 | Reynard et al. | |
| 2005/0126081 A1 | 6/2005 | Patel et al. | |
| 2006/0137261 A1 | 6/2006 | Maly | |
| 2006/0181391 A1 | 8/2006 | McNeill et al. | |
| 2007/0157614 A1 | 7/2007 | Goldman | |
| 2007/0283806 A1 | 12/2007 | Morrison | |
| 2008/0011799 A1 | 1/2008 | Chang | |
| 2008/0022596 A1 | 1/2008 | Boerger et al. | |
| 2008/0127435 A1 | 6/2008 | Maly et al. | |
| 2008/0143290 A1 | 6/2008 | Chavakula | |
| 2010/0146719 A1 | 6/2010 | Swessel et al. | |
| 2011/0075441 A1 | 3/2011 | Swessel et al. | |
| 2011/0203059 A1 | 8/2011 | Whitley et al. | |
| 2012/0025964 A1 | 2/2012 | Beggs et al. | |
| 2012/0304558 A1 | 12/2012 | Iglesias et al. | |
| 2013/0327914 A1 | 12/2013 | McNeill et al. | |
| 2013/0332217 A1 | 12/2013 | McNeill et al. | |
| 2014/0075842 A1 | 3/2014 | McNeill et al. | |
| 2014/0247347 A1 | 9/2014 | McNeill et al. | |
| 2015/0047132 A1 | 2/2015 | Sveum et al. | |
| 2015/0047133 A1 | 2/2015 | Sveum | |
| 2017/0043967 A1 | 2/2017 | Walford et al. | |
| 2017/0320685 A1 * | 11/2017 | Hoofard | E05F 15/40 |
| 2018/0035606 A1 * | 2/2018 | Burdoucci | A01D 34/008 |
| 2019/0002216 A1 | 1/2019 | Walford et al. | |

FOREIGN PATENT DOCUMENTS

| | | |
|---|---|---|
| EP | 2660170 A1 | 11/2013 |
| FR | 2869470 A1 | 10/2005 |
| WO | 2006066013 A2 | 6/2006 |
| WO | 2006076538 A2 | 7/2006 |
| WO | 2008014026 A1 | 1/2008 |
| WO | 2009070509 A1 | 6/2009 |
| WO | WO2010077977 | 7/2010 |
| WO | 2011037839 A1 | 3/2011 |
| WO | 2015023666 A1 | 2/2015 |
| WO | 2015023669 A1 | 2/2015 |
| WO | 2015166339 A1 | 4/2015 |
| WO | 2015084167 | 6/2015 |
| WO | 2016007321 A1 | 1/2016 |
| WO | 2016209141 | 12/2016 |

OTHER PUBLICATIONS

"Pentalift introduces industry's first solar powered dock leveler!" www.pentalift.com, Jun. 14, 2011, 1 page.

APS&GO—LED Communication System Specification Sheet, APS Resource, for APS1102, Nov. 2009, 2 pages.

Energy Saving Products Brochure, APS Resource, Mar. 2009, 4 pages.

FT Ultra LED Flex Arm Docklight Specification Sheet, APS Resource, Form APS 1168, Nov. 2009, 2 pages.

High Impact LED Dock Light Specification Sheet, APS Resource, Form APS1171, Nov. 2009, 2 pages.

KelLey Company; Vehicle Restraints brochure; 2008; 8 pages.

Manual and Automatic Light Communication Systems, User's Manual, Serco, Oct. 2009, 28 pages.

Model G307K2 Kadet 2 Operator Interface with 7" TFT Display, Red Lion Controls, Inc., Nov. 23, 2015, 4 pages.

Rite-Hite Corporation, Rite-Vu Light Communication Systems Brochure, 6 pages.

Safety & Lighting Products Brochure, APS Resource, Sep. 2004, 2 pages.

Serco Vehicle Restraints brochure; 2008; 4 pages.

Serco; Loading Dock Solutions brochure; 2008; 8 pages.

Smart Power Systems International GmbH, Web pages for Hybrid DC/AC Power Supply, Jun. 1, 2004.

International Searching Authority: European Patent Office, PCT Application No. PCT/EP2019/082204, International Search Report and Written Opinion dated Feb. 11, 2020, 16 pages.

* cited by examiner

SYSTEMS AND METHODS FOR AUTOMATED DOCK STATION SERVICING

TECHNICAL FIELD

The present disclosure is directed to distribution centers and, more particularly, to systems and methods for monitoring, scheduling and/or performing maintenance activities of dock stations and dock station components.

BACKGROUND

Commercial enterprises often include distribution, processing, and/or manufacturing centers. Distribution centers are often used to receive, process, and re-ship goods, materials, and/or other items, and typically include at least one dock station configured to receive a trailer for deliveries and shipments. Each dock station typically includes various components to permit and restrict access to and from the distribution center via the dock station. For example, a representative dock station might include a dock door, a dock leveler, a vehicle restraint, a truck presence sensor, a barrier gate, an inflatable shelter, a dock light, a control panel, a dock fan, and/or other dock station components. Examples of loading dock equipment, distribution centers and systems for controlling operations at such facilities are described in, for example, U.S. Pat. Nos. 4,843,373; 5,047,748; 5,168,267; 5,831,540; 6,781,516; 6,975,226; 7,119,673; 7,256,703; 7,274,300; and 8,497,761; in U.S. Patent Publication Nos. 2002/0089427; 2003/0167238; 2013/0332217; 2014/0075842; and 2015/145605; and in U.S. patent application Ser. Nos. 15/305,296; 15/145,605; and 16/109,603 each of which is incorporated herein by reference in its entirety.

Typical dock stations can service upwards of 2,000 trailers per year, performing actions such as restraining loaded 20-ton trailers, supporting movements of loaded fork-lifts, operating heavy doors, etc. These actions can cause significant wear on the dock station components. As a result, dock stations and their components typically require servicing for periodic maintenance and part replacement. Currently, identifying when to service dock stations is typically performed by, e.g., dock station personnel who manually estimate wear on dock station components, and estimate when and/or which servicing actions these observations call for. Often, a distribution center manager may wait until a dock station component fails before performing maintenance. This is not efficient and often results in the busiest dock stations at a distribution center being inoperative for extended periods of time.

BRIEF DESCRIPTION OF THE DRAWINGS

The systems and additional implementations introduced here may be better understood by referring to the following Detailed Description in conjunction with the accompanying drawings, in which like reference numerals indicate identical or functionally similar elements.

DETAILED DESCRIPTION

Figure 1:
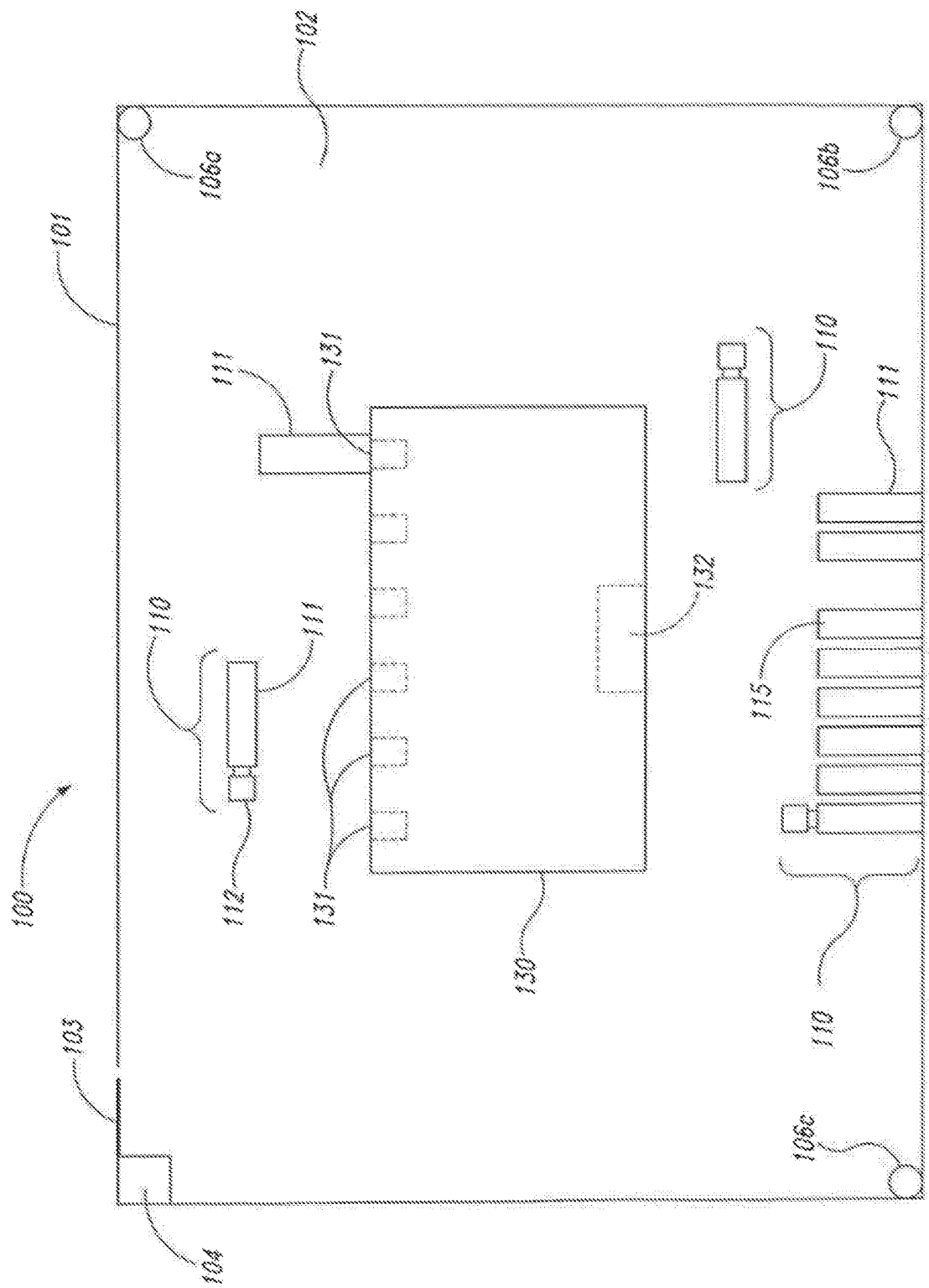
FIG. 1 illustrates a distribution center configured in accordance with some embodiments of the present technology.

Embodiments of the present technology are directed to dock servicing systems that can automatically schedule and/or implement servicing of dock stations and dock station components. For example, dock servicing systems configured in accordance with some embodiments can track dock station and dock station component statuses, analyze these statuses to determine whether they satisfy service conditions for one or more service actions and, when conditions are satisfied, cause the corresponding service actions to be performed.

Some embodiments of the present technology utilize internet of things (IoT) technologies. For example, various aspects of these embodiments utilize sensors and processing elements embedded in dock station components, mesh communications, cloud computing, and other IoT technologies. Further aspects of embodiments of the present technology are directed to a control panel or central processing center of the dock servicing system that can track a number of trailer loading/unloading cycles at a dock station. When the number of cycles reaches a threshold for performing service on the dock station, the dock servicing system can automatically initiate a service action.

In various embodiments of the present technology, examples of service actions that the dock servicing system can initiate include communicating with a maintenance system to place a maintenance request, communicating with an inventory system to place a part request, sending control signals to the control panel and/or to dock station components to disable them or cause them to implement another designated action, and/or sending messages or providing remote controls to other personnel, such as a dock station supervisor.

In further embodiments of the present technology, the dock servicing system can operate as part of, or in conjunction with, a distribution center having one or more dock stations. Each dock station can incorporate a control panel for controlling operations of the dock station components. In some embodiments, the control panel can communicate with a central processing center for the distribution center or across multiple distribution centers. The dock servicing system can facilitate communication within the distribution center or across distribution centers, and between control panels, central processing centers, messaging systems for distribution center personnel, maintenance entities, inventory systems, and/or other networked entities.

In other embodiments of the present technology, data gathering and processing aspects of a dock servicing system can be implemented at one or more control panels and/or at a central processing center with which the control panels and/or dock station components communicate. For example, the control panel can track statuses for dock stations and dock station components, determine when service conditions have been met, and cause service actions to be performed. In another example, the control panel and/or the dock station components can send operational statistics and/or other information to the central processing center (e.g., component activation statistics, automatically detected failure conditions, statistics of actions taken by personnel at the dock station, maintenance or repair history, etc.) which can identify whether the statistics satisfy servicing conditions. When the statistics satisfy the servicing conditions, the central processing center can initiate corresponding service actions. While various activities are described below as being performed by either the control panel or the central processing center, these processes are capable of being performed by either system, by coordinated processes at both systems, or by other systems associated with the control panel and/or the central processing center.

In further embodiments of the present technology, a dock servicing system can track dock station and dock station component statuses by gathering statistics on use of the dock station and/or use of the dock station component, and/or by gathering data from sensors at the dock station. Such statistics and data can be gathered for individual components, such as a vehicle restraint, dock leveler, door, etc., and/or for overall use of the dock station, e.g., the number of load or unload cycles of the dock station. Examples of dock station statistics include number of uses, time in use, and/or such values in relation to an event, e.g., number of uses of a component since the component was last serviced.

Certain details are set forth in the following description and in FIGS. 1-12 to provide a thorough understanding of various embodiments of the present technology. In other instances, well-known structures, systems, operations, materials, etc. often associated with distribution centers, logistics yards, transport vehicles (including over the road "OTR" tractors and trailers as well as dedicated terminal tractors), dock stations, dock station equipment, processing and storage systems, wireless communication systems, etc. have not been set forth in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can add other details, dimensions, angles and features without departing from the spirit or scope of the present invention. In addition, those of ordinary skill in the art will appreciate that further embodiments of the invention can be practiced without several of the details described below.

In general, identical reference numbers in the Figures identify identical, or at least generally similar, elements. To facilitate the discussion of any particular element, the most significant digit or digits of any reference number generally refers to the Figure in which that element is first introduced. For example, element 110 is first introduced and discussed with reference to FIG. 1.

Distribution Center

FIG. 1 is a partially schematic plan view of a distribution center 100 configured in accordance with embodiments of the present technology. By way of example, the distribution center 100 may be part of a processing center, a manufacturing center, or any other facility that includes dock stations and which may include an adjacent area for the transfer of goods, materials, etc. In some embodiments, the distribution center 100 can include a boundary or enclosure 101 (e.g., a wall or fence) that surrounds the distribution center 100 and a corresponding logistics yard 102 to provide security. The enclosure 101 can include a vehicle entrance/exit gate 103 with a guard booth 104.

A plurality of tractor/trailer combinations 110 may be present in the logistics yard 102 at any given time. Each tractor/trailer combination 110 includes a tractor 112 that is operably coupled to and separable from a cargo trailer 111, e.g., an over the road ("OTR") trailer. These vehicles are commonly referred to as "semi-trucks" and "semi-trailers," respectively. It should be understood, however, that the term "tractor/trailer combination" and the like, as used herein, can generally refer to other types of carrier vehicles, such as integral units, which are generally known as straight trucks. Accordingly, the present technology is not limited to use with only tractor/trailer combinations and may be used in virtually any distribution-type facility with virtually any type of vehicle including tractor/trailer combinations, straight trucks, vans, and the like. In addition to the tractor/trailer combinations 110, the yard 102 can also contain a plurality of individual tractors 112 and/or individual trailers 111 at any given time. The trailers 111, for example, may be parked in corresponding parking locations 115 prior to loading and/or unloading.

The distribution center 100 includes a building 130 (e.g., a warehouse, manufacturing facility, or other facility for shipping/receiving goods, materials, etc.). In the illustrated embodiment, the building 130 includes a plurality of dock stations 131 (which may also be referred to herein as "dock stations," "dock stations," "loading docks," and the like). Each dock station 131 is configured to facilitate loading and unloading of goods and materials from, for example, a trailer. As described in further detail below, the building 130 can include a central processing center 132 to coordinate operations in the logistics yard 102 and at the dock stations 131. The central processing center 132 can also interact with and/or control a facility enterprise resource planning (ERP) system, an associated material handling system, and/or other operational systems associated with the distribution center 100. In the illustrated embodiment, the central processing center 132 is depicted as being located or integrated within the building 130. In other embodiments, however, the central processing center 132 is not limited by location and may be located remotely from the building 130 and/or in virtually any other location.

As described in greater detail below, in some embodiments the central processing center 132 includes automated processing systems configured to communicate instructions to, for example, the tractor/trailer combination 110, receive feedback from the tractor/trailer combination 110, and automatically respond to the feedback. Furthermore, the central processing center 132, may be utilized to gather dock station status data from one or more control panels, determine whether the dock station status data satisfies any pre-established service conditions, and, if so, cause one or more corresponding service actions to be performed, such as communicating alerts or notices, sending maintenance requests, sending part requests, and/or disabling part or all of a dock station. The central processing center 132 can also generate/compile reports, alerts, and notices regarding operations in the logistics yard 102, the dock stations 131, the ERP system, and any associated material handling systems or software packages.

In some embodiments, the distribution center 100 can include a local positioning system to locate the positions of vehicles in the yard relative to, for example, a ground map of the distribution center 100. In some embodiments the distribution center 100 can include a plurality of beacons 106 (identified individually as a first beacon 106a, a second beacon 106b and a third beacon 106c) positioned in known locations around the logistics yard 102 (e.g., in different corners of the yard 102). In some embodiments, the beacons can include Wi-Fi transmitters to enable Wi-Fi positioning of the tractor 112 and/or the trailer 111 in the logistics yard 102. For example, the beacons 106 can include wireless access points each having a unique identifier (e.g., a media access control or "MAC" address). The tractor 112 can include a wireless receiver and can determine its location using conventional triangulation techniques based on, for example, the radio signal strength (RSS) of the wireless signals received from the respective beacons 106. It should be understood that in many embodiments of the present technology, the local positioning systems described above can be used in conjunction with a conventional GPS or other location tracking system for guidance of the tractor 112. In some embodiments, the distribution center 100 can use this location data to determine part of a dock station status. For example, a forklift associated with a dock station can be tracked to determine how far it has traveled since its last maintenance.

Bluetooth and WiFi are just two of the types of communication technology that the distribution center 100, control panels 300, and other dock station components can utilize communicate and control one another in the yard 102. In other embodiments, other types of suitable communications can be used such as wireless local area network systems (WLAN), dead reckoning systems, Zigbee systems, Z-wave systems, thread, etc.

Dock Station

Figure 2:
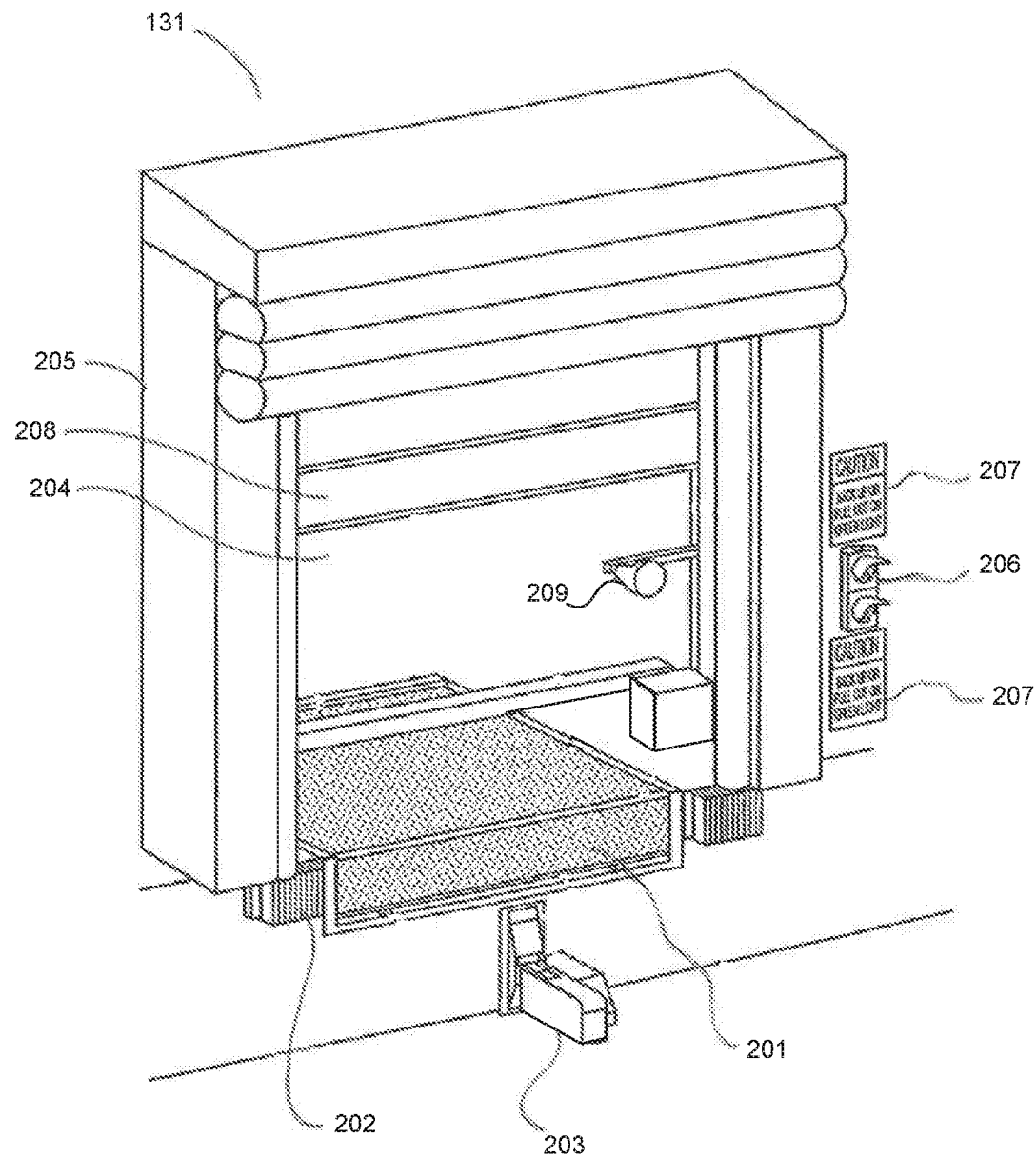
FIG. 2 illustrates a dock station configured in accordance with some embodiments of the present technology.

FIG. 2 is an exterior elevation view of the dock station 131 configured in accordance with embodiments of the present technology. In some embodiments, the dock station 131 includes a dock leveler 201 for material transport between the building 130 and the trailer 111 (FIG. 1) via an opening 204, a set of dock bumpers 202 to interface between the building 130 and the trailer 111 and prevent damage to the building 130, and the vehicle restraint 203 configured to releasably engage the trailer 111 and prevent inadvertent movement of the trailer 111 away from the dock station 131 during loading and unloading. The dock station 131 can further include a dock door 208 (e.g., an overhead door) to cover the opening 204 when not in use, and a dock shelter or seal 205 to help seal the dock opening 204 around the trailer body. The dock station 131 can also include a signal light or lights 206 to indicate to a vehicle driver when it is safe to approach and depart the dock station, a dock light 209 to illuminate the inside of a trailer at the dock station, as well as an instructional placard 207 with related information.

In some embodiments, when the trailer 111 arrives at the dock station 131, dock station personnel can perform a load and/or unload workflow procedure or protocol. The load/unload workflow procedure can include backing the trailer up to the dock station 131, engaging the vehicle restraint 203 to keep the trailer 111 in place, opening the dock door 208, activating the dock leveler 201, unloading and/or loading the trailer 111 with a forklift, storing the dock leveler 201, closing the dock door 208, disengaging the vehicle restraint 203, and pulling the trailer 111 away from the dock station 131. Additional details regarding an example load/unload cycle for operating the dock station are described below in relation to process 700 with respect to FIG. 7.

Control Panel

Figure 3:
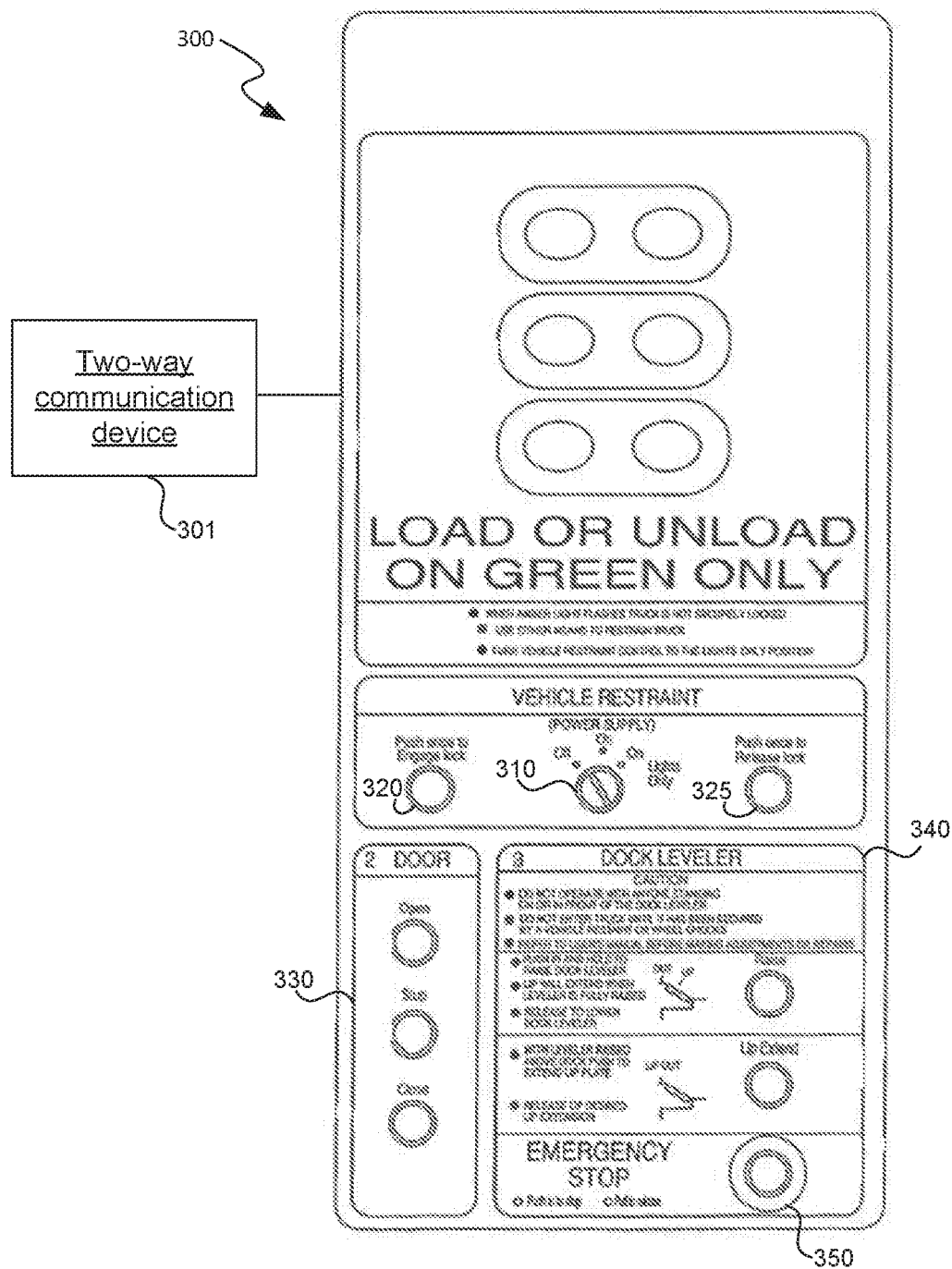
FIG. 3 illustrates a control panel configured in accordance with some embodiments of the present technology.

FIG. 3 illustrates a control panel 300 configured in accordance with embodiments of the present technology. The control panel 300 can be located on an inside wall of the dock station 131 adjacent to the dock opening 204. The control panel 300 is operably connected to some of the components 200 of the dock station 131 (e.g., the dock leveler 201, the vehicle restraint 203, an opener for the overhead door 208, the indication lights 206, etc.) and can be configured to enable personnel or automated processes to control operation of these components. The control panel 300 may include, for example, a power controller 310, vehicle restraint controllers 320/325, door controllers 330, dock leveler controllers 340, an emergency stop 350, or other user interfaces and controls. While the control panel 300 is illustrated as a unit with individual control buttons and switches, other embodiments are contemplated, such as embodiments in which some or all of the control buttons and switches are replaced by a touch screen display which can provide variable information and control interfaces.

In addition, the control panel 300 may incorporate a two-way communication device 301 to enable communication between the control panel 300 and one or more of: devices carried by distribution center personnel, a communication gateway device, the central processing center 132, maintenance entities 410 (FIG. 4), inventory systems 420

(FIG. 4), and/or service applications 430 (FIG. 4) that can be accessed by a remote device such as a smart telephone or computer tablet. An example of such a communication device is a Delta Products model IFD8540 Bluetooth Mesh Module enabling communication from the control panel PLC to a building network 502 (FIG. 5).

Figure 4:
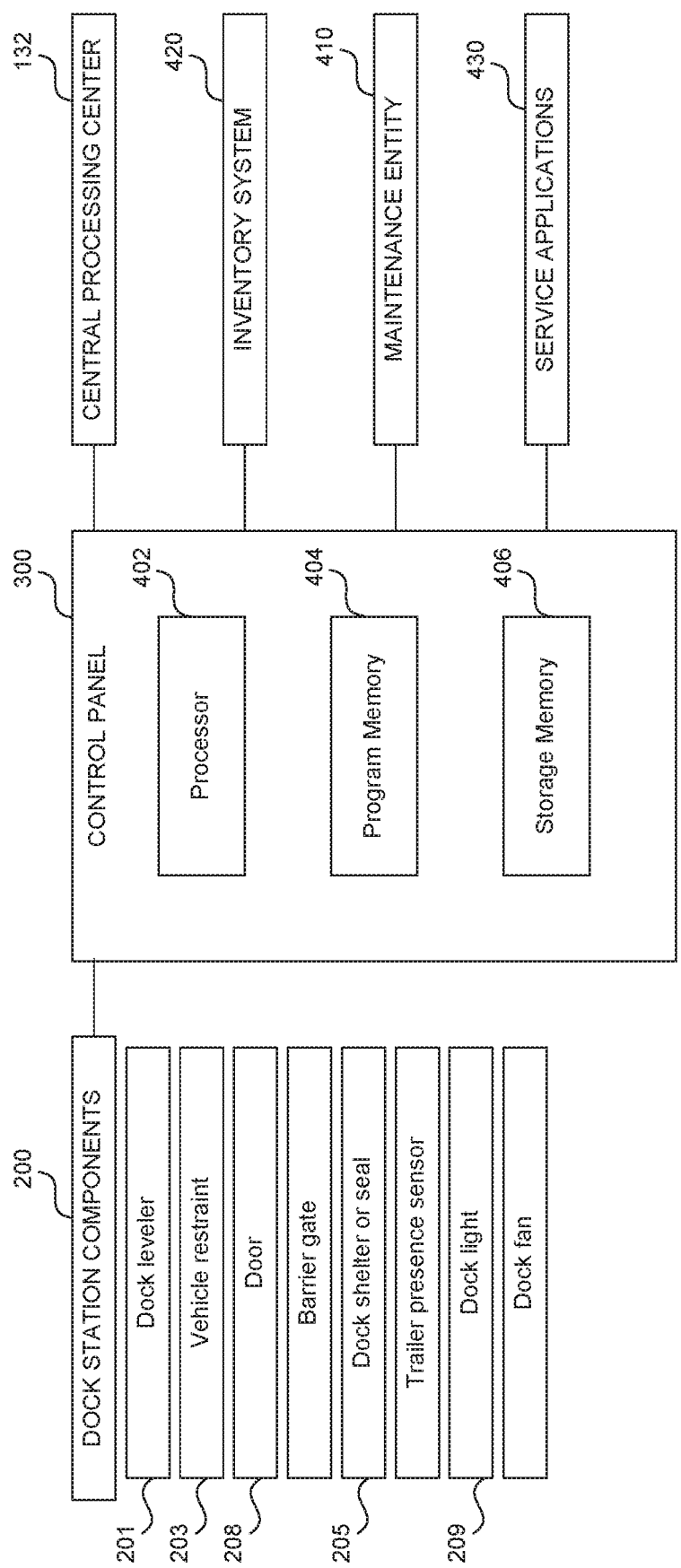
FIG. 4 is a block diagram of a control panel and associated systems configured in accordance with some embodiments of the present technology.
Figure 5:
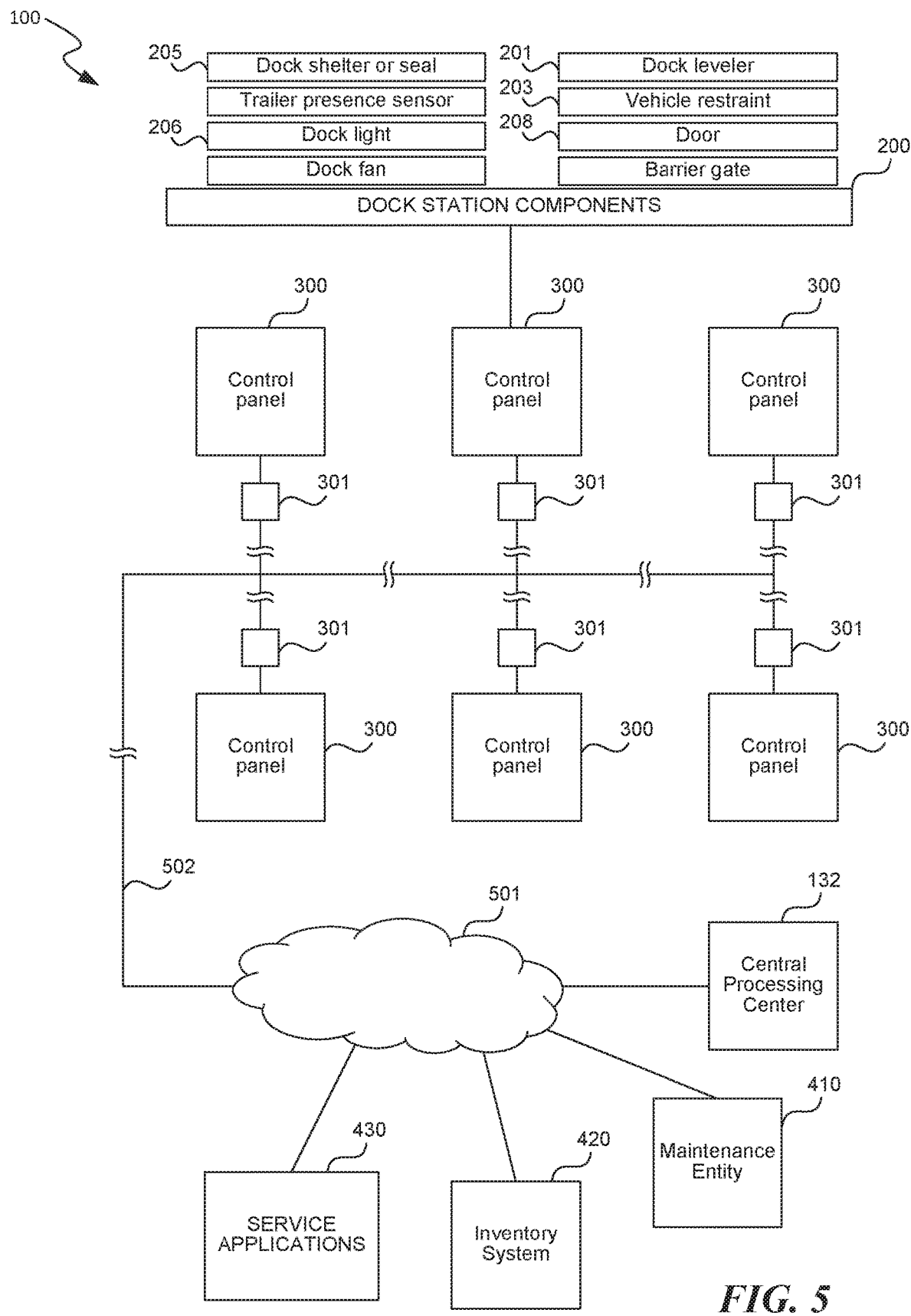
FIG. 5 illustrates a distribution center with multiple dock stations and corresponding control panels that can communicate over a network with a central processing center, in accordance with some embodiments of the present technology.

FIG. 4 is a block diagram of the control panel 300 and associated systems configured in accordance with some embodiments of the present technology. The control panel 300 can be operably connected to the dock station components 200, the central processing center 132, the maintenance entities 410, the inventory systems 420, and/or the service applications 430 via, e.g., wired or wireless connections. Examples of wireless communications that can be utilized to enable communications by the control panel 300 include WiFi, Cellular, mesh networks (e.g., Zigbee, Z-Wave, Bluetooth, Thread, etc.), or others. The control panel 300 can include a processor 402, a program memory 404, and a storage memory 406. In concert, these components can implement one or more of processes 700-1100 described below with reference to FIGS. 7-11. In various embodiments, the control panel 300 can include one or more processing devices that can implement one or more of the processes 700-1100 described below with reference to FIGS. 7-11. For example, in some embodiments, the control panel 300 can include a Programmable Logic Controller (PLC) that allows many different control sequences and interconnect relationships. The PLC can accept input signals from various devices such as limit switches and push buttons, and then transmits output signals to various devices such as lights, relays and motors in accordance with the logic defined by control programs contained in memory. Specific electrical circuits and program statements for such PLCs are well known in the dock station industry.

The maintenance entities 410 can include, for example, dock station personnel and/or outside specialists that can perform maintenance. Communications between the control panel 300 and the maintenance entities can include sending messages (e.g., text messages, emails, voice messages, etc.) or providing notifications for qualified maintenance personnel, or scheduling maintenance with an outside service provider, e.g., thorough messaging and/or through interactions with an Application Program Interface (API) of the maintenance entity. Similarly, the inventory systems 420 can include a local inventory of parts available to be installed at the dock station, or a retail or wholesale provider of dock station components. Communications between the control panel 300 and the inventory systems 420 can include communicating with dock station personnel to retrieve and install a piece of dock station equipment (e.g., a vehicle restraint, dock leveler, door, etc., or components of these pieces of equipment) from an existing inventory, or communicating with a dock station component provider to order the dock station components.

The service applications 430 can include applications that dock station personnel can interact with for dock station service actions. For example, the service applications 430 can enable personnel to receive automated notifications and messages from the control panel 300 and/or the central processing center 132, to send control signals to remotely operate the control panel 300 and/or one or more of the dock station components 200, to obtain status data for particular dock stations, to communicate among dock station personnel, etc. For example, one of the service applications 430 can be a mobile or desktop application that provides control interfaces for control panel functions. Such functionality can be driven by elements stored in one or more databases. For example, when the control panel 300 sends a notification (e.g., an indication that a maintenance request is needed or that a dock station component has failed) to a database, the database can create an element for the notification. When the service application 430 connects to the database, if it is configured to receive the type of notification specified by the database element, and it has not previously retrieved the database element, the service application can retrieve the database element and use it to generate a notification for a user of the service application 430.

Distribution Center Network

FIG. 5 is a block diagram illustrating an example embodiment of the distribution center 100 with multiple dock stations and corresponding control panels 300 that can communicate over a network with the central processing center 132. The control panels 300 can include the two-way communication devices 301 for communicating with a building network 502, which may either be a wired or wireless network. In some embodiments, the building network 502 can include a gateway device which, by way of example, may be a Systech Model SL-08-E2, part number 996673, which allows wireless communication between the building network 502 and a remote version of the central processing center 132 via a network 501 (e.g., a public network, such as the Internet). The networks 501 and/or 502 can also provide communications between the various control panels 300.

The central processing center 132 can include one or more servers which receive requests and coordinate fulfillment of those requests. Though the central processing center 132 and other entities, such as the maintenance entities 410 and the inventory systems 420, are depicted in the Figures logically as a single element, such server computing devices can each be a distributed computing environment encompassing multiple computing devices located at the same or at geographically disparate physical locations. Either or both of the networks 501 and 502 can include a local area network (LAN), a wide area network (WAN), or other wired or wireless networks. The network 501 may be the Internet or some other public or private network. The network 501 and/or 502 can include a wireless network, e.g., using WiFi, cellular, mesh networks (e.g., Zigbee, Z-Wave, Bluetooth, Thread), etc. The control panels 300 can be connected to the network 502 through the two-way communication device 301, such as by wired or wireless communication. In some embodiments, the control panels 300 can communicate through each other and other dock station components to access the network 502, e.g., using connections such as Bluetooth, Zigbee, Z-Wave, Thread, or other connection configurations.

The central processing center 132 can utilize a database that stores information, such as aggregated dock station status information from the one or more control panels 300, maintenance history for the dock stations 131 and/or the dock station components 200, dock station and/or dock station component maintenance schedules, instances of scheduled maintenance, dock station component inventories, etc. Each such database can include a distributed computing environment encompassing one or more computing devices.

Central Processing Center

Figure 6:
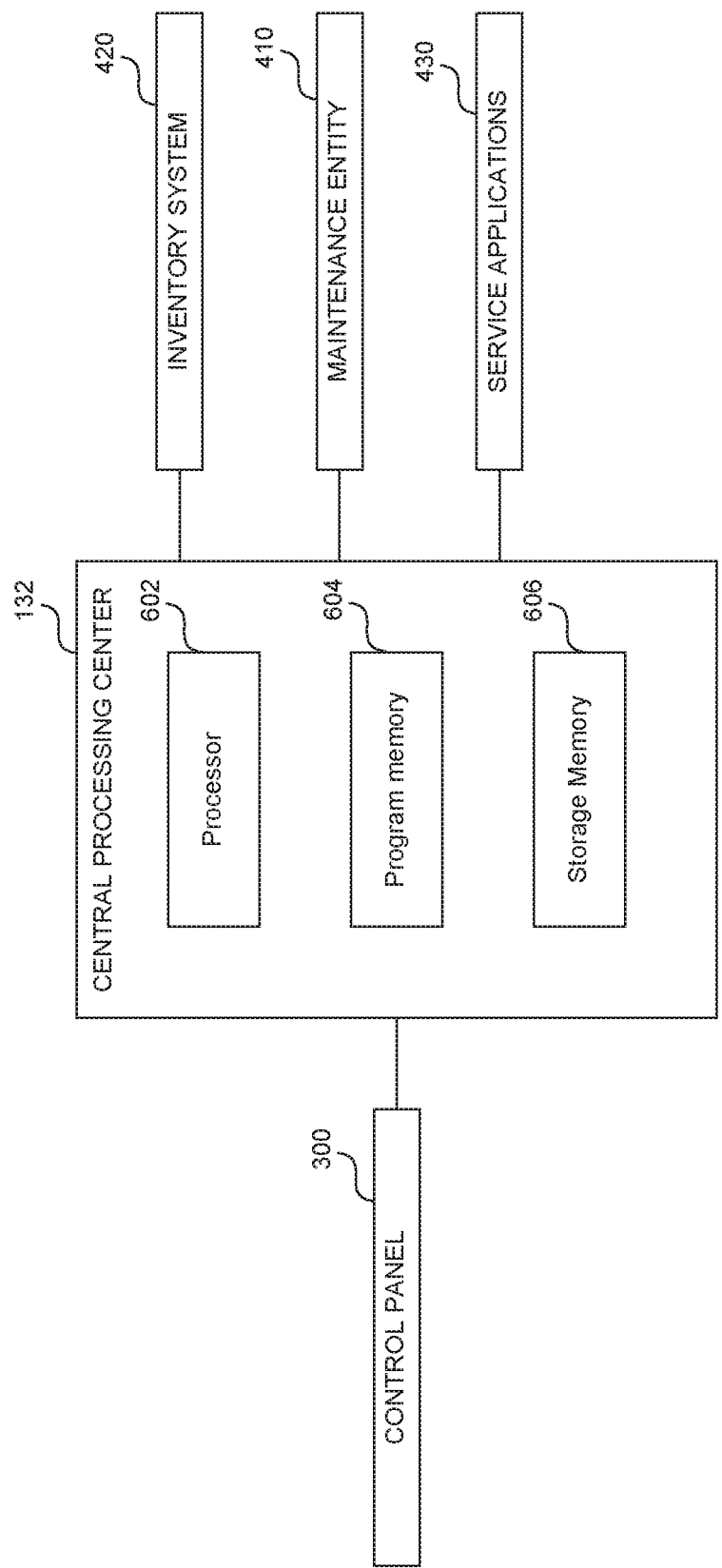
FIG. 6 is a block diagram of a central processing center and associated systems configured in accordance with some embodiments of the present technology.

FIG. 6 is a block diagram of the central processing center 132 and associated systems configured in accordance with some embodiments of the present technology. The central processing center 132 can connect to the control panels 300, the maintenance entities 410, the inventory systems 420, and/or the service applications 430, e.g., via wired or wireless connections as described above.

The central processing center 132 can include a processor 602, a program memory 604, and a storage memory 606. The central processing center 132 can receive dock station status data from the control panels 300, the dock station components 200, and/or other entities (e.g., maintenance providers, inventory systems, dock station personnel via connected devices and workstations, other data aggregation systems, etc.). The processor 602 can execute programs from the storage memory 606. For example, the central processing center 132 can determine whether the dock station status data satisfies any service conditions and, if so, the central processing center 132 can automatically send signals or messages to one or more of the control panels 300, the maintenance entities 410, the inventory systems 420, and/or the service applications 430.

The central processing center 132 can receive dock station status data from multiple distribution centers and can coordinate maintenance requests and/or part requests among the different distribution centers. For example, when the central processing center 132 determines that a single dock station at each of four geographically close distribution centers needs maintenance, the central processing center 132 can coordinate with one of the maintenance entities 410 to service all four dock stations in a single trip, which can reduce costs for the individual distribution centers and/or increase profitability for the maintenance entity.

The central processing center 132 can also aggregate dock station status data across distribution centers, which can be used as training data for predictive machine learning models (described below) to determine, e.g., expected life and/or maintenance cycles for dock station components; to anticipate maintenance, parts, or other service needs; and/or to accurately identify dock station metrics and statistics, such as traffic.

In some embodiments, personnel can access data from the central processing center 132, e.g., by using a mobile device or workstation loaded with a program (e.g., a specialized program, web interface, database access program, etc.) configured to obtain and present data from the central processing center 132. In various embodiments, such access can be provided to personnel such as workers at the dock station, supervisors, quality, safety, or supply managers, inventory maintenance workers, etc. These personnel can be at a facility housing the central processing center 132 or remote from that facility. In some cases, these personnel can manipulate or augment the data at the central processing center 132, such as by manually entering additional data or adjusting data in the central processing center 132. In some embodiments, these personnel can also remotely initiate actions though the program, such as maintenance requests, part replacement requests, disabling or enabling dock station components, etc. In some further embodiments, the personnel can see pending actions (e.g., actions initiated by other personnel or automatically initiated in response to service conditions) and can cancel them or otherwise adjust them, such as by modifying a time at which they are scheduled, modifying which entity is scheduled to perform them, grouping multiple activities together to be performed by a maintenance provider, changing what activity is to be performed (e.g., upgrading a maintenance request to schedule maintenance for additional dock station components), etc.

Dock Station Operating Cycle

Figure 7:
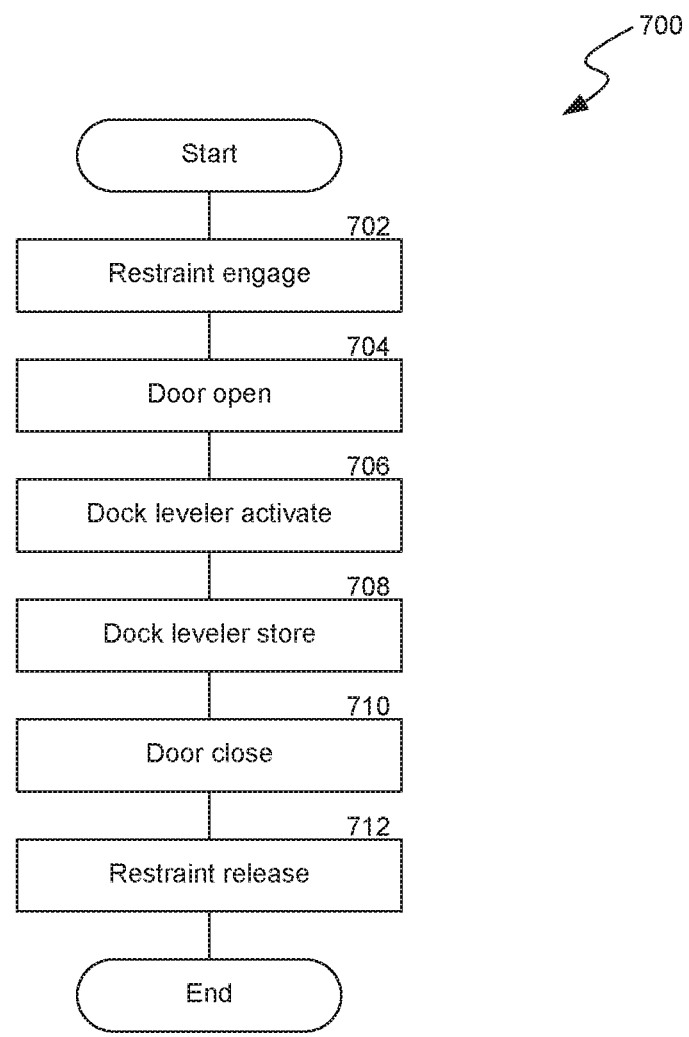
FIG. 7 is a flow diagram illustrating a process for a cycle of operating a dock station, in accordance with some embodiments of the present technology.

FIG. 7 is a flow diagram illustrating a process 700 for a dock station load/unload cycle, in accordance with some embodiments of the present technology. As shown in FIG. 2, the dock station 131 typically includes the dock door 208 elevated at a distance above the ground and an exterior area for a trailer 111 to be backed up to the dock door 208. To provide safe and efficient loading and unloading, the trailer 111 typically needs to be centrally aligned with respect to the dock door 208.

Once proper alignment of the trailer 111 at the dock station 131 has been achieved and confirmed at block 702, the vehicle restraint 203 (e.g., a mechanical hook, wheel chock, etc.) is engaged with the trailer 111 to prevent the trailer 111 from moving away from the dock bumpers 202 during loading and/or unloading. In some cases, an individual is tasked with manually pressing a control button on the control panel 300 that causes the vehicle restraint 203 to engage the trailer 111 after the driver or a warehouse worker has communicated to the individual that the trailer is correctly aligned.

After the vehicle restraint 203 is properly engaged, a visual signal (e.g., an illuminated green light) can be provided inside the dock station 131 to notify dock station personnel that it is safe to load/unload the trailer.

Outside the dock station 131, another visual signal (e.g., an illuminated red light 206) can be provided to warn the vehicle driver against moving the trailer 111. Steps are then taken to ensure the interior area in front of the dock door 208 is ready for loading and unloading. For example, the interior area in front of the dock door 208 is typically checked to ensure that the area is clear of debris or materials that would obstruct a fork lift loading/unloading the vehicles. Individuals inside the warehouse typically attend to checking the interior area of the dock station, clearing any debris, and communicating that the interior area is ready for loading and/or unloading. Once the "all clear" message is conveyed by the person tasked with checking the interior area, an individual can then open the dock door 208 at block 704.

Next, at block 706, the dock leveler 201 is extended between the floor of the building and the open end of the trailer. Conventional dock levelers include a deck that rotates into position as a lip on the front edge of the deck extends outward and comes to rest on the bed of the trailer. Once the dock leveler 201 is in place, the dock personnel are authorized to begin the loading and/or unloading of the trailer, e.g., using the fork lift or other transportation system.

Once the unloading and/or loading process is complete, the process is reversed: the dock leveler is stored at block 708, the door is closed at block 710, the vehicle restraint is released at block 712 and a visual signal (e.g., an illuminated green light 206) is provided to indicate driver can leave with the trailer.

Processes for Automating Service Actions

Figure 8:
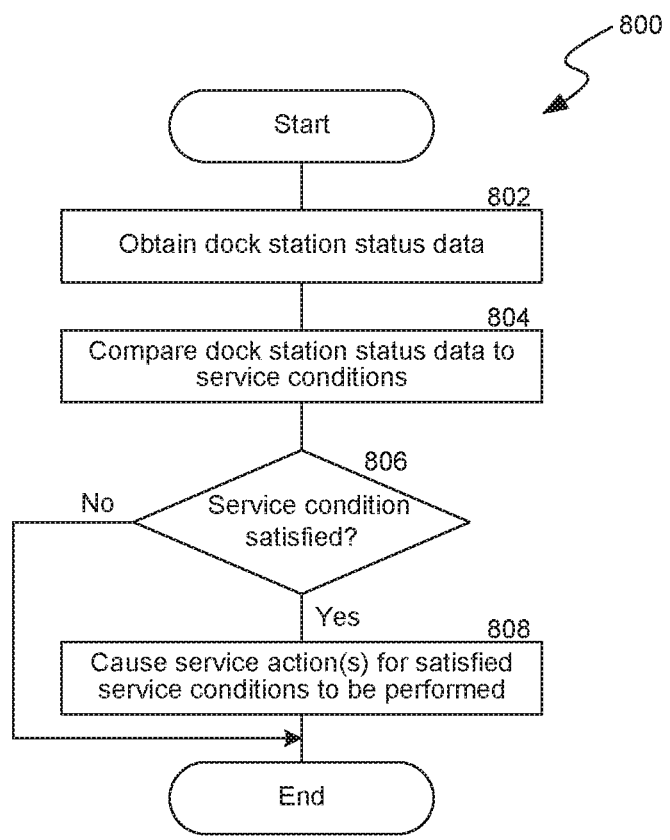
FIG. 8 is a flow diagram illustrating a process for automatically performing a service action based on a comparison between dock station status data and service conditions, in accordance with some embodiments of the present technology.

FIG. 8 is a flow diagram illustrating a process 800 for automatically performing a service action based on dock station status data satisfying one or more service conditions, in accordance with some embodiments of the present technology. In various embodiments, the process 800 can be performed by one or both of a control panel 300 and/or the central processing center 132.

In block 802, the process 800 can obtain dock station status data. The dock station status data can include any data indicative of the state of the dock station and/or the individual components of the dock station. For example, the dock station status data can include one or more of: amount of use data, level of wear data, functional state data, and/or adjustment factors. The amount of use data can include statistics such as one or more of: counts of dock station component load/unload cycles (e.g., vehicle restraint cycles, door open/close cycles, dock leveler cycles, etc.), amount of time the dock station components have been in use, dock station component deploy and store times, location tracking data (e.g., data tracking tractor positions to determine distances traveled), etc. The level of wear data can include, for example, one or more of: images of dock station components that can indicate wear, sensor readings for dock station components (e.g., temperature, contact, movement, pressure, contact, current draw, vibration, etc.) that can indicate a state of the component with the sensor, dock station operator reports (e.g., observations made during periodic dock station component checks), maintenance history, etc. The functional state data can include indications of a component fault, whether a component has been disabled, whether the component was disabled manually or automatically, remedial actions taken, etc. For example, if the control panel 300 sends a signal to a dock leveler but the dock leveler is unresponsive, the dock leveler can be identified as potentially having a fault.

The dock station components 200 can operate differently in various circumstances, such as different weather conditions, serving different types and/or configurations of trailers, being at different elevations, being operated by different personnel, and/or having different dock station configurations (e.g., which components are included or how they are arranged), etc. The adjustment factors can include indications of such circumstances for a particular dock station and/or dock station component. For example, the adjustment factors can specify whether or to what degree the dock station has experienced such circumstances or has operated in specific dock station operating conditions. More specifically, examples of the adjustment factors can include dock location data (e.g., for humidity, amount of dust/sand, etc.), weather data (e.g., specific data for an area and time period or typical weather patterns for the area), distribution center statistics (e.g., average loaded trailer weight, trailer configurations, previous maintenance needed ahead of schedule, etc.), indications of the dock station configuration (e.g., which components are employed or how they were arranged), profiles of the personnel that operate the dock station, etc.

The process 800 can obtain the dock station status data from one or more of: the control panel 300, one or more of the dock station components 200, a database that has accumulated dock station status data, or an external data source. For example, as the central processing centers for multiple distribution centers gather status data, the status data can be transferred to a database system. This database system accumulating the data from the multiple distribution centers provides opportunities for optimizing servicing actions across the distribution centers and mining the data for inferences such as identifying situations that cause accidents, identifying more accurate maintenance schedules for dock station components, or using the accumulated data to train models (discussed below). The control panel 300 can record and provide status data by logging component actuations that the control panel 300 controls (e.g., when it sends control signals to the dock leveler 201 or the vehicle restraint 203). In some embodiments, the dock station components 200 can be equipped with various types of sensors (e.g., contact sensors, pressure sensors, etc.) and can provide this status data via the control panel 300 or directly to, e.g., the central processing center 132. Examples of such dock station status data can include maintenance records, component installation or replacement dates, distribution center statistics, etc. Additional dock station status data can be obtained from an external data source, such as a weather service, dock station component manufacturer, inventory system, trailer manifest system, dock station vehicle navigation system, etc.

In block 804, the process 800 can compare dock station status data obtained at bock 802 with one or more service conditions. The service conditions can include, for example, mappings of a "key" to one or more service actions. A service condition key can be any conditional operation that, when evaluated, provides a satisfied or not-satisfied result. In various embodiments, the service conditions can have different types of keys. For example, a service condition key can be one or more rule expressions that can be evaluated to true (satisfied) or false (not-satisfied) when applied against dock station status data. As another example, a service condition key can include a trained model, based on machine learning, that can receive dock station status data and produce a value (e.g., on a spectrum from 0-1) that can be translated to satisfied or not-satisfied (e.g., less than or equal to 0.5 is not satisfied and greater than 0.5 is satisfied).

A rule expression can specify one or more rules that can be evaluated with the dock station status data by, e.g., defining one or more values or value ranges for a condition type. The rule expression for a service condition can be defined as an expression of multiple rules connected with operators, such as equivalents of: "AND" "OR" "<" ">" "NOT" "+" "−" "/" "*", etc. The service condition key, when expressed as a rule expression, is satisfied when the rule expression evaluates to true.

The rules can be defined for combinations of the different types of dock station status data (e.g., the amount of use, the level of wear, the functional state, and/or the adjustment factors). For example, one or more rules in a service condition key can be based on an established standard usage life and/or maintenance cycle for a dock station and/or dock station component. As a more specific example, the dock leveler 201 may have a maintenance cycle of 2 years and a usage life of 10 years, assuming one shift operation with eight trailers per day. This can translate to 8 trailers per day times 5 days per week times 50 weeks per year, which yields 2,000 load and/or unload cycles per year. The dock leveler's maintenance cycle is thus 4,000 load and/or unload cycles and a standard usage life of 20,000 load and/or unload cycles. In some embodiments, the dock station component usage life and/or the maintenance cycle may be defined as a number of operating hours. For example, the dock light might have an illuminating element life of 10,000 hours. In yet other instances, dock station component life may be determined by time since installation, such as 5 years, regardless of number of uses or time in use. Counts of use for the dock station and/or for the individual dock station components can be tracked by the control panel 300 and/or by the central processing center 132 and applied to rules when executing the process 800.

An example single-rule key based on amount-of-use data could be the rule expression: "number_of_dockStation_loadUnload_cycles> maintenanceMaximum" where the "number_of_dockStation_loadUnload_cycles" is obtained from a count in the dock station status data by a log kept by the control panel 300 and the "maintenanceMaximum" is specified in the dock station status data as a maximum number of load/unload cycles before each dock station should be scheduled for maintenance. An embodiment using this type of expression is described in greater detail below in reference to process 900 of FIG. 9.

Rules that employ amount-of-use data may rely on typical or expected dock station component characteristics, such as a typical number of uses before maintenance is needed.

Other rules, such as rules based on levels of wear or functional states of dock station components, however, can allow for actions to be taken in response to unexpected behavior in particular dock station components. For example, sensors such as cameras, pressure sensors, contact sensors, temperature sensors, current sensors, etc., can provide readings and/or status indicators for particular dock station components. Images captured by a camera can be automatically analyzed to identify dock station components and/or conditions of dock station components. Pressure sensors can identify when a dock station component is correctly being placed or returned to a standby position, such as pressure on a vehicle restraint 203 measured to identify correct attachment to the vehicle or pressure applied by the dock door 208 to identify when the door is closed. Temperature sensors can measure when a component is creating excess friction, e.g., if a dock leveler 201 is rubbing against its housing when is it deployed. Current sensors can measure the current draw for various dock station component motors, to identify whether the motor is working harder than expected, which can indicate a fault.

Service condition keys can be established with rules that specify when these readings and/or status indicators indicate a problem, which can be mapped to corrective service actions. For example, a key can include a rule that is satisfied when a temperature inside a refrigerated dock station opening goes above a threshold temperature.

An example of a multiple-rule expression in a service condition key that applies to amount-of-use data and level-of-wear data is:

```
"((number_of_dockStation_loadUnload_cycles>
    maintenanceMaximum*0.75) AND other_dock-
    Station_maintenance_scheduled>0) OR (num-
    ber_of_dockStation_loadUnload_cycles> main-
    tenanceMaximum*0.95) OR
    (fan_current_draw>standard_fan_current_draw*1.5),"
```

In this example, the key is satisfied when the dock station status data indicates (1) the dock station has reached 75% of the maximum number of load/unload cycles before maintenance and there is at least one other dock station that has a scheduled maintenance request, (2) the dock station has reached 95% of the maximum number of load/unload cycles, or (3) the fan for the dock station is drawing one-and-a-half times a standard amount of current. This key can be mapped to an action to schedule maintenance for the dock station. This results in (1) economy of scale for dock station maintenance because maintenance is scheduled early (at the 75% mark) when a maintenance entity is already scheduled to perform maintenance on another dock station, (2) increased dock station safety by scheduling maintenance whenever a dock station needs immediate servicing (at the 95% mark), and (3) proactive maintenance when a problem is indicated by the dock station fan working 1.5 times harder than expected.

In some embodiments, the level of wear and/or the functional state data can be pre-processed to determine conditions prior to applying the rules that use a condition. For example, images taken of a dock station component can be analyzed to identify objects and/or object conditions, such as an amount of remaining material, tears or ruptures, contortions of material, etc. As more specific examples, an image of a vehicle restraint can be analyzed to identify fraying in a cable, an image of a dock leveler can be analyzed to identify whether it fully extends when it is activated, images of internal components such as gears or belts can be analyzed to determine whether they show signs of excessive wear, etc. In some embodiments, object recognition and machine learning models (described below) can be used to make these determinations. For example, a model can be trained to recognize particular objects based on image training data that include marked versions of the objects or conditions of the objects. The results of this pre-processing can be used by rules in service condition keys. For example, pre-processing can take an image of a cable used by a vehicle restraint, can identify a location on the cable that is the thinnest, and can take a measurement of that thinnest spot. The pre-processing can also identify whether any fraying of the cable strands exist. A rule expression based on these determinations, such as "cable_min_diameter<1_inch OR has_fraying," can then be evaluated. A key using this rule expression can be mapped to a service action, such as disabling the dock station and scheduling immediate maintenance of the vehicle restraint. Additional pre-processing can include grouping status data elements (e.g., grouping data from different equipment, such as by loading dock, by equipment type, by dock personnel, etc.), applying filters, determining abnormalities, adding meta-data (e.g., time stamps, dock station identifiers, equipment identifiers), etc.

The adjustment factors can also be used in various rules to adjust how the rule is evaluated based on context. For example, an adjustment factor can change a standard usage life and/or maintenance cycle based on, e.g., weather conditions or trailer weights. More specifically, a service condition key for a vehicle restraint can specify that a standard life is 15,000 uses on trailers that, when loaded, weigh up to 18 tons, but each use on a loaded trailer above 18 tons counts as 1.5 uses. An example rule expression for this key is "(uses_under_18_tons+(uses_over_18_tons*1.5))>15,000" which could be mapped to the service action to replace the vehicle restraint.

In some instances, the dock station component life may be determined based on the life of other components present at the dock station. For example, the vehicle restraint may have the shortest maintenance cycle and/or life, and when the vehicle restraint is serviced or replaced, the other dock station components may also be scheduled for maintenance or replacement.

In some embodiments, a service condition key can include a trained model that receives identified conditions or other values from the dock station status data and produces an indication of whether the key is satisfied. A "rained model" or "model," as used herein, refers to a construct that is trained using training data to make predictions or provide probabilities for new data items, whether or not the new data items were included in the training data. In some embodiments, training data can include training items, each of which including parameters (e.g., dock station status data) and an assigned classification. When the trained model receives a new data item with similar types of parameters, the model can assign a classification to the new data item.

For example, training items can be based on maintenance logs for dock stations across multiple distribution centers. Each instance of service for a dock station in each maintenance log can have a corresponding timestamp. A record of the dock station status data for the serviced dock station can be obtained at the time of, and/or leading up to, the service instance. The dock station status data can include various types of elements, e.g., a number of load/unload cycles the dock station has performed since its last server, an average weight of trailers serviced, a total amount to time the dock station lights have been illuminated, etc. Because each set of these conditions existed leading up to a service, they can be assigned a "satisfied" or "1" classification, corresponding to a service action. Additional training items assigned a "not-satisfied" or "0" classification can be generated by assigning these classification to additional dock station status data that existed, at the dock station, at times at least a threshold amount prior to the dock station needing servicing. A model can then be trained with these training items, as discussed below, to predict when the dock station service conditions indicate a maintenance service is needed.

In some embodiments, a model can provide a probability distribution resulting from the analysis of training data, such as a distribution of when different dock stations have needed maintenance or a likelihood of a dock station component failing, based on an analysis of a large number of previously identified correspondences between dock station status data and human initiated maintenance requests, part replacement requests, emergency shutdown actions, etc. Examples of suitable models include: neural networks, support vector machines, decision trees, decision tree forests, Parzen windows, Bayes, clustering, reinforcement learning, probability distributions, and others. Models can be configured for various situations, data types, sources, and output formats.

In some embodiments, a trained model can include a neural network with multiple input nodes that receive dock station status data or identified conditions extracted from the dock station status data, e.g., as individual values, as a sparse vector, as a histogram version of an image, etc. The input nodes can correspond to functions that each receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as a determination of whether the key has been satisfied. For example, the output can be a value between 0-1, with the closeness to either end of this spectrum indicating a confidence factor for the determination. An output closer to a 1 can be translated to a "satisfied" result for a service condition key and an output closer to a 0 can be translated to a "not-satisfied" result for the service condition key.

Continuing the previous example in which training items are based on maintenance logs, the model can be used as a key in a service condition where the service action is to schedule maintenance for the dock station (i.e., the action which defined whether the training items were assigned a "satisfied" or "not-satisfied" classification.) On a periodic basis (e.g., hourly, daily, weekly, etc.) the status data, from each of a set of monitored dock stations can be formatted in a manner similar to the training items (e.g., extracting the same types of data as was used in the training items) and then is applied against the model (e.g., representations of this data can be supplied to input nodes of the model.) Each node produces a result, which and propagates up to the output node(s) to produce a model result. Where the model result is closer to a 1 (or a threshold amount above 0.5) the key is satisfied and the maintenance is scheduled for that dock station.

A neural network can be trained with supervised learning in which the training data includes dock station status data as input, and corresponding human actions taken (e.g., maintenance requests made, parts ordered, emergency shutdown engaged, a component logged as having a certain amount of wear, etc.) as the comparison factor. During training, as these training items are applied to the model, output from the model can be compared to the comparison factor (i.e., the key is "satisfied" when the output is closer to the 1 end of the spectrum when the action to which the neural network key is mapped is the same the human action in the training item). Based on the comparison, the neural network can be modified, such as by changing weights between nodes of the neural network or parameters of the functions used at each node in the neural network such that model output provides a better output for the key's "satisfied" or "not-satisfied" result. While the above describes one configuration of a neural network, other configurations can be used in addition to or in lieu of the specific configuration described above.

Further to the previous example, the training items generated based on the maintenance logs can each be applied to a previously untrained model, e.g., by entering values from the status data in a vector and supplying at least a part of the vector to each input node of the model. When the training item is classified as a "satisfied" training item, model parameters are adjusted to make the model output closer to a 1. When the training item is classified as a "not-satisfied" training item, model parameters are adjusted to make the model output closer to a 0. After supplying a sufficient amount of the training times, the model will be trained to make predictions about dock station maintenance service needs.

In decision block 806, if any of the service conditions are satisfied, the process 800 continues to block 808. If none of the service conditions are satisfied, the process 800 can end. At block 808, the process 800 can cause the service actions that correspond to the service conditions with satisfied keys to be performed. For example, the service conditions can be mapped to a variety of service actions, such as sending maintenance and/or part requests, providing control signals to the control panel 300 and/or to one or more of the dock station components 200, and/or sending messages to other personnel, such as a dock station manager, e.g., to check a component status or to manually schedule a service action.

The control panel 300 and/or the central processing center 132 can send the maintenance requests directly to one or more of the maintenance entities, and the requests can indicate the dock station and/or the dock station component that receives the maintenance and the type of maintenance. This request can occur in various ways such as: by filling in fields of an email or other message template and sending the completed message to the maintenance entity, by interacting with an API of the maintenance entity that allows automatic maintenance scheduling, or by signaling to dock station personnel to coordinate maintenance for the particular dock station or piece of equipment. In response to the maintenance request, the maintenance entity can schedule maintenance for the indicated dock station and/or dock station components.

The control panel 300 or the central processing center 132 can send part requests directly to one or more of the inventory systems which indicate the dock station to receive the replacement parts. Similarly to maintenance requests, part requests can occur in various ways such as by: filling in fields of a message template and sending the completed message, interacting with an Application Program Interface (API) of an inventory system, or signaling to dock station personnel to acquire and replace a component for the particular dock station.

In some embodiments, the part request can first query an inventory system for the distribution center or for a set of distribution centers to determine if the replacement part is already in-stock. If so, the process 800 can signal (e.g., via SMS, email or other electronic messaging system, by mobile app notification, etc.) to dock station personnel to retrieve and install the replacement part. If the part is not in the dedicated inventory system, the process 800 can send a part request to one or more other inventory systems. In some embodiments, the process 800 can determine a preferred retail inventory system (e.g., based on lowest price, a contractual agreement, bulk order benefits, etc.) and place the order with the preferred retail inventory system. In response to the part request, the inventory system that receives the part request can schedule a shipment of a part and/or a technician to go to the distribution center 100 and replace the part. Additional details on some embodiments for sending maintenance and/or part requests are described below with reference to process 1100 of FIG. 11.

In some embodiments, instead of automatically scheduling the maintenance and/or requesting the part for each dock station, the process 800 can aggregate the part and/or the maintenance requests from multiple dock stations in a distribution center or across multiple distribution centers. When a threshold number of part and/or maintenance requests are pending, or a threshold amount of time has elapsed for one or more of the part and/or maintenance requests, the process 800 can proceed to schedule the aggregated part and/or maintenance requests. In some cases, the part and/or maintenance requests can be identified as critical or non-critical based on, e.g., whether the dock station can operate without the maintenance or part replacement, or whether the distribution center has other dock station capacity to continue operation with the indicated dock station being non-functional. When the part or maintenance request is critical, the process 800 can immediately schedule it and any other pending part and/or maintenance requests.

In some embodiments, in addition to or instead of placing the part and/or maintenance request, a satisfied key in a service condition can be mapped to actions to automatically control a dock station and/or dock station component. Examples of such automatic actions include: disabling a dock station control panel, disabling particular dock station components, actuating lights or alarms, activating a warning at the control panel 300, controlling the motion of a dock station component, initiating a dock station load/unload cycle (e.g., the process 700), enabling operation of the dock station and/or dock station component, etc. Control signals from the central processing center 132 can be sent to the control panel 300 or directly to the dock station components 200.

In some embodiments, in addition to or instead of placing a part and/or maintenance request and/or sending control signals to the control panel 300 and/or dock station components 200, the satisfied service condition key can be mapped to service actions to send one or more communications (e.g., electronic messages, notifications, alerts, etc.). Service actions can specify particular communication recipients. For example, a service condition with an action to replace a part can also include a service action to communicate with an inventory manager to notify the inventory manager of a placed part request. As another example, a service condition with an action to disable a dock station can also include a service action to communicate with a dock station supervisor to request that the dock station supervisor check the dock station. The communication can provide controls (e.g., links, buttons, response keywords, etc.) that allow the dock station supervisor to remotely disable or enable the dock station and/or dock station components.

In some embodiments, communications can be sent to a default recipient, such as a dock station manager or a notice system that will push communications out to users that connect to the system. For example, the service condition can specify actions to schedule a maintenance request and provide a notification of the maintenance request. The notification can be added to a notification database. Various dock station personnel can have mobile devices with an installed app that connects to the database and is configured to retrieve specific types of notifications. When the specific type of notification includes a maintenance request, the app can retrieve the notification of the maintenance request and provide it to the personnel via the mobile device.

Additional details on some embodiments that use service condition mappings for each of maintenance requests, part requests, controlling dock station components, and dock station personnel messaging are described in more detail below in reference to process 1000 of FIG. 10.

Figure 9:
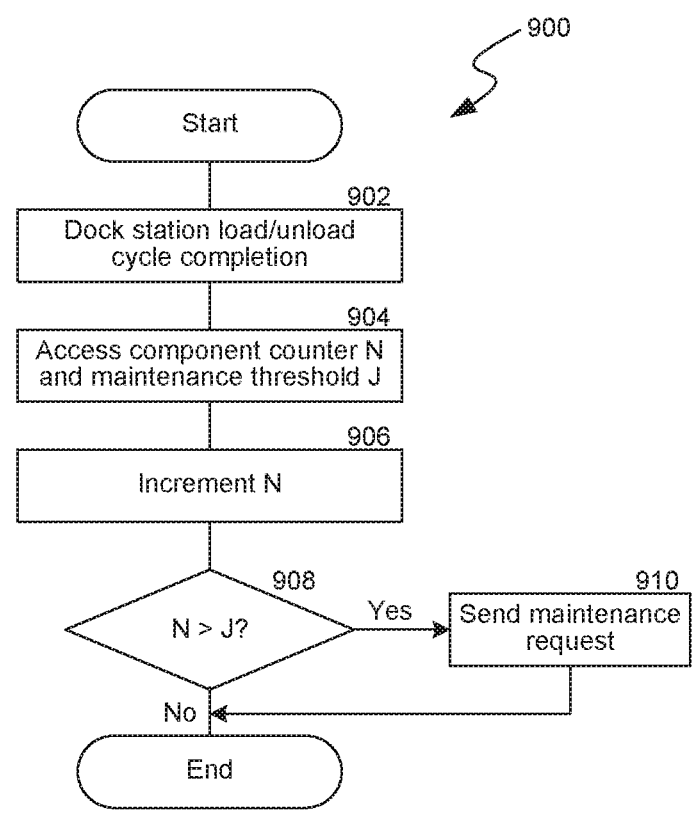
FIG. 9 is a flow diagram illustrating a process for automatically requesting maintenance for a dock station based on a count of dock station operating cycles, in accordance with some embodiments of the present technology.

FIG. 9 is a flow diagram illustrating a process 900 for automatically requesting maintenance for a dock station based on an automatically tracked count of operating cycles for the dock station being above a threshold, in accordance with some embodiments of the present technology. In various embodiments, the process 900 can be performed by one or both of a control panel 300 and/or the central processing center 132. In some embodiments, the process 900 is a more specific example of the process 800 in which blocks 902-906 correspond to block 802, block 908 corresponds to blocks 804 and 806, and block 910 corresponds to block 808. As this example demonstrates, a service condition may be a conditional statement (e.g., an "if" statement) that corresponds to an action (e.g., "send maintenance signal").

In block 902, the process 900 determines that the dock station cycle has been completed. For example, when the process 700 completes, as determined by the control panel 300, the control panel 300 can perform the process 900 or can signal to the central processing center 132 to perform the process 900.

At block 904, the process 900 can obtain dock station status data that includes a component counter N and a maintenance threshold J. The component counter N can be a count (e.g., number of times, amount of time, etc.) a particular dock station component has been used and the maintenance threshold J can be a pre-established amount of use (number of uses, amount of time in use, etc.) before the dock station component should receive maintenance. In block 906, the process 900 can increment the component counter N. When the maintenance threshold is based on the amount of time in use, N can be incremented by the amount of time that the dock station component was in use. When the maintenance threshold is based on the number of uses, N can be incremented by the number of times (e.g., 1) that the dock station component was used during the dock station cycle.

In decision block 908, the process 900 can compare the counter N with the threshold J to determine whether the dock station component tracked by the counter N should be scheduled for a maintenance service. If the counter N is greater than the threshold J, the process 900 continues to block 910 and the maintenance request is sent. If the counter N is not greater than the threshold J, the process 900 can end.

Figure 10:
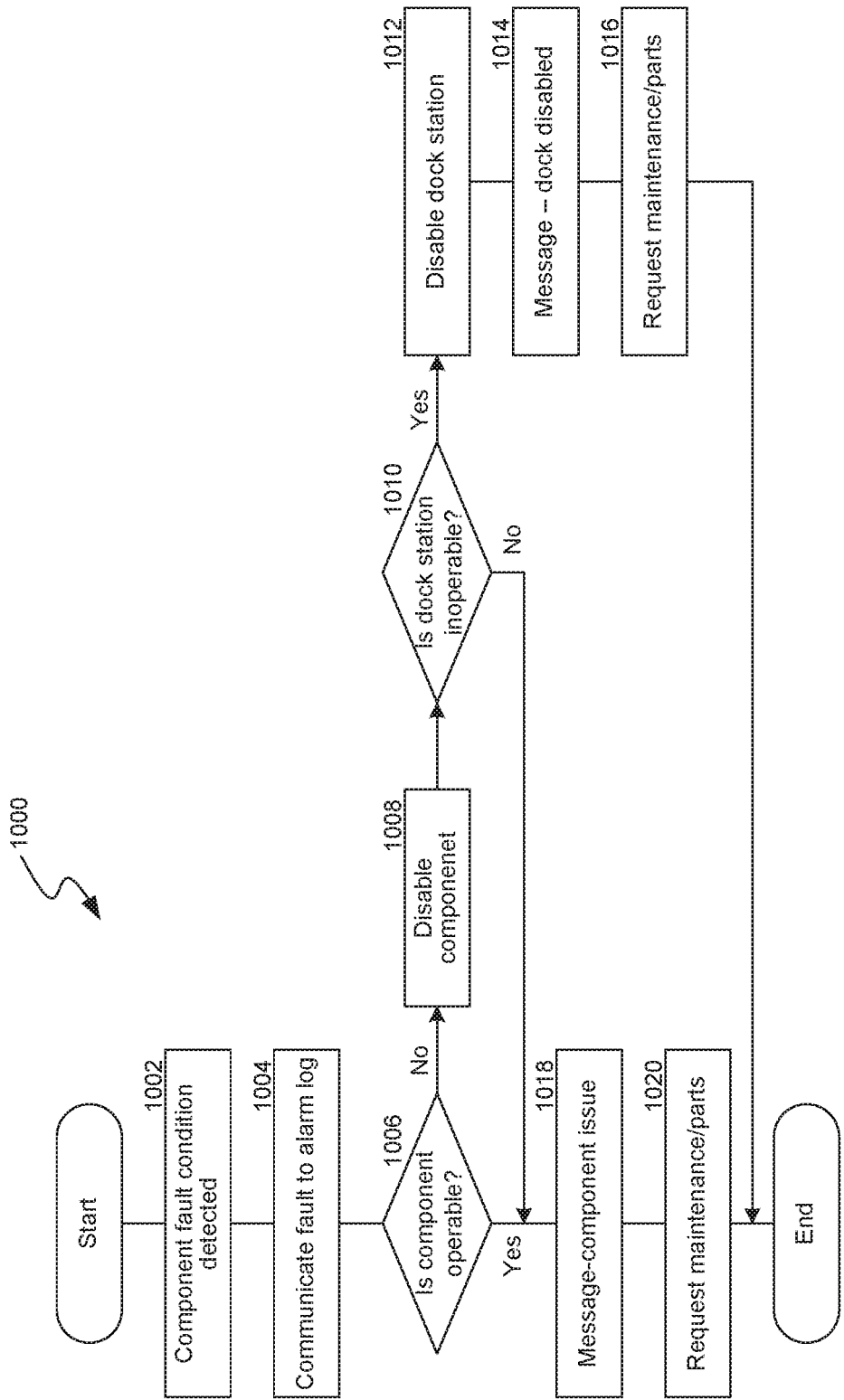
FIG. 10 is a flow diagram illustrating a process for detecting a fault in a dock station component and responding by automatically performing maintenance requests, part requests, controlling dock station components, and/or messaging dock station personnel, in accordance with some embodiments of the present technology.

FIG. 10 is a flow diagram illustrating a process 1000 for detecting a fault in a dock station component and responding by automatically initiating maintenance requests or part requests, controlling dock station components, and/or messaging dock station personnel. In various embodiments, the process 1000 can be performed by one or both of a control panel 300 and/or the central processing center 132. In some embodiments, the process 1000 is a more specific example of the process 800 in which blocks 1002 and 1004 correspond to block 802, blocks 1006 and 1010 correspond to blocks 804 and 806, and blocks 1008 and 1012-2020 correspond to block 808.

The process 1000 begins in block 1002 when a component fault is detected by, e.g., the control panel 300 or central processing center 132. As described above, a component fault can be indicated by levels of wear and/or functional state indicators in the dock station status data. These indications can be based on images, sensor measurements, dock station personnel reports, etc. For example, a component fault can be identified when an image shows a remaining amount of material for a component to be below a threshold, when a heat sensor reads a temperature a threshold amount above a safety threshold, when a contact sensor that should be tripped when a component is stored has not been tripped, etc. In block 1004, the fault can be reported to an alarm log at the control panel 300 and/or the central processing center 132.

In decision block 1006, the control panel 300 or the central processing center 132 can respond to the fault report by determining whether the component is operable. This can be accomplished automatically e.g., by determining whether sensor readings are within acceptable levels, by generating a digital model of the component based on images and/or other sensor readings and then determining whether the digital model indicates the component is in a useable state, or by applying a machine learning model that is trained to identify component operability to images or other dock station status data. If the component is not operable, the process 1000 continues to block 1008. If the component is operable, the process 1000 continues to block 1018.

In block 1008, the process 1000 can disable the inoperable dock station component. In various embodiments, this can include causing the control panel 300 to not send control signals to the dock station component, signaling the dock station component to power down, and/or setting a dock station component status as "disabled" in a tracking system. This can be done by the causing the control panel 300 itself or by the central processing center 132.

In decision block 1010, the process 1000 can determine whether disabling the dock station component causes the dock station to be inoperable. For example, certain dock station components, such as the dock leveler 201, can be identified as necessary for the dock station to operate, while others, such as the vehicle restraint 203 can have back-up systems, such as wheel chocks, that allow the dock station to continue operating. As process 1000 demonstrates, service conditions can be nested. For example, the service condition with the key corresponding to block 1010 is only checked if the service condition with the key corresponding to block 1006 is satisfied. If disabling the dock station component causes the dock station to be inoperable, the process 1000 can continue to block 1012.

In block 1012, the process 1000 can disable the dock station, e.g., by signaling the control panel 300 and/or individual dock station components to not accept further commands until the dock station has been re-enabled. At block 1014, the process 1000 can also send communications to specified dock station personnel or to a notification system to indicate that the dock station has been disabled. At block 1016, the process 1000 can send the maintenance and/or part requests as necessary to fix the dock station component(s) and thus allow the dock station to be reenabled. The process 1000 can then end.

If, from decision block 1006 or decision block 1010, the process 1000 continued to block 1018, in block 1018 the process 1000 can send communications to indicate the issue with the dock station component while the dock station continues to operate. For example, this can include setting a warning signal at the control panel 300, sending a message to a dock station supervisor or other dock station personnel, and/or setting a notification in a log to be provided to connected applications (e.g., mobile or desktop) with appropriate permissions. At block 1020, the process 1000 can schedule a maintenance and/or part request to address the detected fault. After block 1020, the process 1000 ends.

Figure 11:
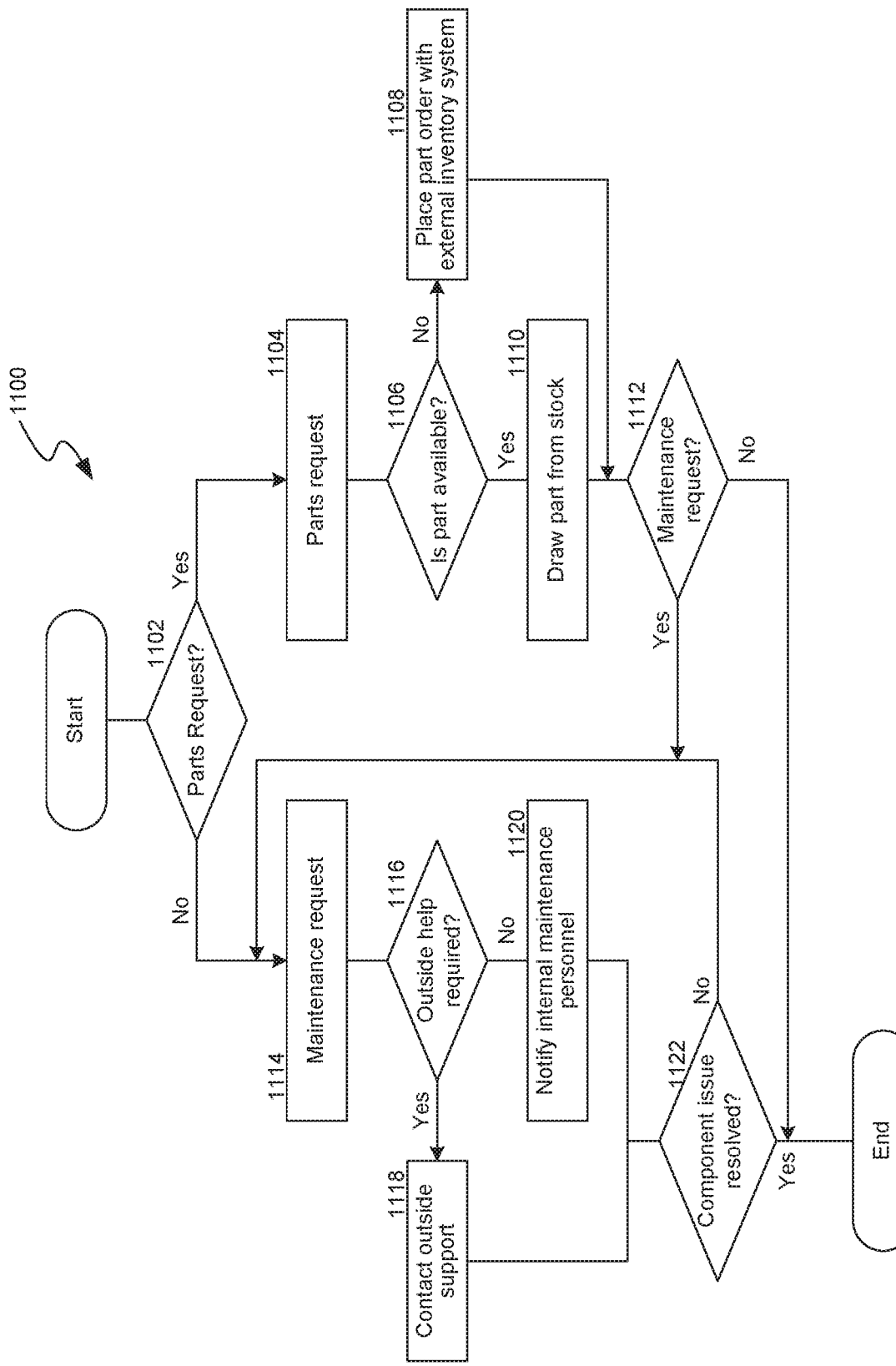
FIG. 11 is a flow diagram illustrating a process for performing maintenance and/or part request service actions, in accordance with some embodiments of the present technology.

FIG. 11 is a flow diagram illustrating a process 1100 for performing maintenance and/or part request service actions, in accordance with some embodiments of the present technology. For example, the process 1100 can be initiated at various points such as block 808 (FIG. 8) when a satisfied key is mapped to a maintenance and/or part request, at block 910 (FIG. 9), at block 1016, or at block 1020 (FIG. 10). In various embodiments, the process 1100 can be performed by one or both of a control panel 300 and/or the central processing center 132. In some embodiments, the process 1100 can be initiated to only perform a maintenance request, in which case the process 1100 can begin at block 1114. In some embodiments the process 1100 can be initiated to only perform a part request, in which case the process 1100 can only include blocks 1104 1110.

In decision block 1102, the process 1100 determines whether a part request is needed. This can be based on a determined amount of wear on a dock station component, an indication of a fault in a dock station component, and/or an amount of use determination for a dock station component reaching an end-of-life threshold. If a part request is needed, the process 1100 proceeds to block 1104. If the part request is not needed, the process 1100 proceeds to block 1114.

At block 1104, the process 1104 can initiate the part request. At block 1106, the process 1100 can determine whether the part is available in stock. If so, the process 1100 can continue to block 1110 where the needed part is drawn from the stock, inventory records are updated, and the part is installed at the dock station. If the part is not in stock, the process 1100 can proceed to block 1108, where an order for the part is placed with an external inventory system. The process 1100 can then continue to block 1112.

In decision block 1112, the process 1110 can determine whether a maintenance request is also necessary. If so, the process 1110 proceeds to block 1114. If not, the process 1110 ends.

In block 1114, the process 1110 initiates the maintenance request. At block 1116, the process 1110 determines whether the status of the dock station and/or dock station component can be serviced by an internal maintenance entity or whether an external maintenance entity is needed to perform the maintenance. For example, component maintenance can have different levels, such as just an inspection, a simple maintenance (e.g., adding lubricant to a component or replacing hydraulic fluid), a more complicated maintenance (e.g., dismantling a motor and aligning gears), or removal and replacement of parts. Some maintenance tasks can be specified as requiring an outside specialist while others can be performed by internal dock station personnel. As another example, some specific dock station components (e.g., dock door 208) can be serviced by internal dock station personnel while other dock station components (e.g. tractor 112) can only be serviced by outside specialists. If the maintenance can be performed internally, the process 1100 proceeds to block 1120 where a communication is provided to internal dock station personnel to perform the maintenance. If the maintenance cannot be performed internally, the process 1100 continues to block 1118, where the process 1100 sends the communication to an external maintenance entity for scheduling the maintenance.

In some embodiments, the portion of the process 1100 between blocks 1114 and 1120 can be repeated until a determination is made in decision block 1122 that the issue with the dock station component has been resolved, at which point the process 1100 ends.

Dock Servicing System Processing Capabilities

Figure 12:
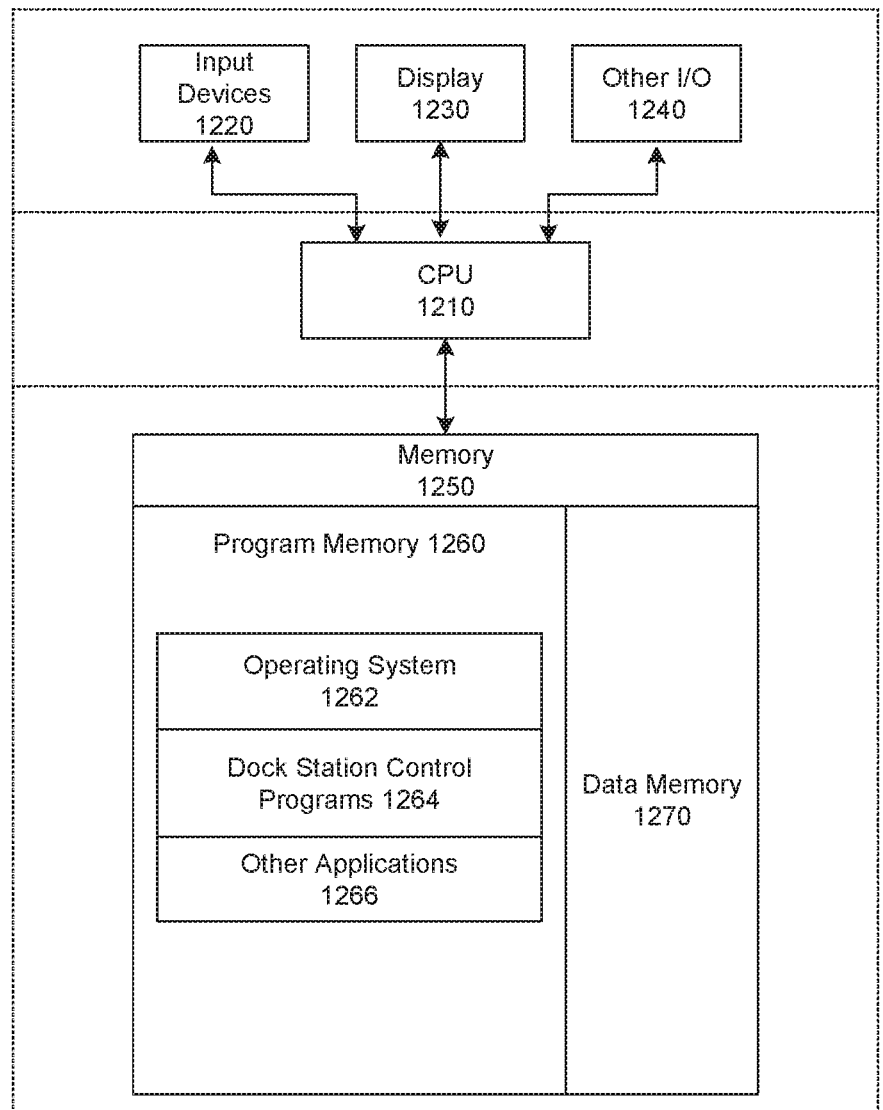
FIG. 12 is a block diagram illustrating an overview of an example processing device, in accordance with some embodiments of the present technology.

FIG. 12 is a block diagram illustrating an overview of an example processing device 1200, in accordance with some embodiments of the present technology. Various devices described above, such as the control panel 300, central processing center 132, and others can include processing capabilities that can be implemented by including a version of device 1200. While the device 1200 is described below as having components 1210-1270, some versions of the device 1200 can have more, fewer, or alternate components.

The device 1200 can include one or more input devices 1220 that provide input to the processor(s) 1210 (e.g., CPU(s), GPU(s), HPU(s), etc.), notifying it of actions. The actions can be mediated by a hardware controller that interprets the signals received from the input device and communicates the information to the processors 1210 using a communication protocol. The input devices 1220 can include, for example, a mouse, a keyboard, a touchscreen (e.g., a control panel touch screen), switches or buttons (e.g., controllers 31-350), an infrared sensor, a touchpad, a camera- or image-based input device, a microphone, various sensors, and/or other user input devices.

The processors 1210 can be a single processing unit or multiple processing units in a device or distributed across multiple devices. The processors 1210 can be coupled to other hardware devices, for example, with the use of a bus, such as a PCI bus or SCSI bus. The processors 1210 can communicate with a hardware controller for devices, such as for a display 1230. The display 1230 can be used to display text and graphics. In some embodiments, the display 1230 provides graphical and textual visual feedback to a user. In some embodiments, the display 1230 includes the input device as part of the display, such as when the input device is a touchscreen. In some embodiments, the display 1230 is separate from the input device, e.g., a screen connected to a control panel 300. Examples of display devices are: an LCD display screen, an LED display screen, a projected, holographic, or augmented reality display, and so on. Other I/O devices 1240 can also be coupled to the processor, such as a network card, video card, audio card, USB, firewire or other external device, camera, printer, speakers, disk drives, etc.

In some embodiments, the device 1200 also includes a communication device capable of communicating wirelessly or wire-based with a network node. The communication device can communicate with another device or a server through a network using, for example, TCP/IP, Zigbee, Z-Wave, Bluetooth, WiFi, or other communication types. The device 1200 can utilize the communication device to distribute operations across multiple network devices.

The processors 1210 can have access to a memory 1250 in a device or distributed across multiple devices. A "memory" includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. The memory 1250 can include program memory 1260 that stores programs and software, such as an operating system 1262, dock station control programs 1264 (e.g., for implementing one or more of processes 700-1100), and other application programs 1266. The memory 1250 can also include data memory 1270, storing data which can be provided to the program memory 1260 or any element of the device 1200.

Some embodiments can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, programmable consumer electronics, network PCs, minicomputers, mainframe computers, distributed computing environments that include any of the above systems or devices, or the like.

Reference in this specification to "embodiments" (e.g., "some embodiments," "various embodiments," "one embodiment," "an embodiment," etc.) means that a particular feature, structure, or characteristic described in connection with the embodiment is included in at least one embodiment of the disclosure. The appearances of these phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and embodiments have been described herein for purposes of illustration, but various modifications can be made without deviating from the scope of the embodiments and embodiments. The specific features and acts described above are disclosed as example forms of implementing the claims that follow. Accordingly, the embodiments and embodiments are not limited except as by the appended claims.

Any patents, patent applications, and other references noted above are incorporated herein by reference. Aspects can be modified, if necessary, to employ the systems, functions, and concepts of the various references described above to provide yet further embodiments. If statements or subject matter in a document incorporated by reference conflicts with statements or subject matter of this application, then this application shall control.

The components and steps illustrated in the Figures may be altered in a variety of ways. For example, the order of the logic may be rearranged, substeps may be performed in parallel, illustrated logic may be omitted, other logic may be included, etc. In some embodiments, one or more of the components described above can execute one or more of the described processes.

We claim:

1. A central processing center for automating dock station servicing, the central processing center comprising:
   a transceiver configured to receive status data associated with one or more dock station components;
   one or more processors; and
   a memory storing instructions that, when executed by the one or more processors, cause the central processing center to perform operations including—
      determining whether the status data satisfies one or more service conditions, wherein determining whether the status data satisfies a service condition of the one or more service conditions includes applying a trained model to at least some of the status data, wherein applying the trained model provides a determination for whether the service condition is satisfied, and wherein the trained model was trained by:
         for each particular training item of a plurality of training items, adjusting one or more aspects of the trained model based on a comparison of (A) output generated by the trained model for status data of the particular training item to (B) a satisfied or not-satisfied categorization of the particular training item; and
      when the status data received by the transceiver satisfies at least one of the service conditions, causing one or more service actions to be performed.

2. The central processing center of claim 1 wherein the status data received by the transceiver includes, for at least one of the dock station components, one or more of:
   a total number of uses;
   a number of uses since a service;
   a total amount of time in use;
   an amount of time in use since the service;
   an identification of an equipment fault; or
   any combination thereof.

3. The central processing center of claim 1 wherein at least some of the status data received by the transceiver is generated by a control panel in response to the control panel controlling one or more of the dock station components.

4. The central processing center of claim 1 wherein at least some of the status data received by the transceiver is generated based on data gathered by a camera or sensor operably associated with at least one of the dock station components.

5. The central processing center of claim 1 wherein the operations further comprise processing one or more images included in the status data received by the transceiver to automatically identify at least a portion of one of the dock station components or a status of the portion of the one of the dock station components.

6. The central processing center of claim 1:
   wherein at least a portion of the status data received by the transceiver traverses part of a Zigbee, Z-wave, Bluetooth, or Thread network; and
   wherein the network includes multiple dock station component nodes.

7. The central processing center of claim 1:
   wherein determining whether the status data received by the transceiver satisfies the one or more service conditions includes determining that an amount of uses of dock station components, specified in the status data received by the transceiver, is at least as large as a maintenance threshold, and
   wherein the one or more service actions include initiating a maintenance request.

8. The central processing center of claim 1 wherein the one or more service actions include one or more of:
   initiating a maintenance request;
   initiating a part request;
   causing a notification to be provided via an application on a mobile device remote from the central processing center; or
   any combination thereof.

9. The central processing center of claim 8 wherein the one or more service actions include the notification and wherein the notification includes a control to initiate a further action via the mobile device, wherein the further action includes enabling or disabling use of a control panel or at least one of the dock station components.

10. A method for automating dock station servicing, the method comprising:
    obtaining status data associated with one or more dock station components;
    comparing the status data to one or more service conditions to determine whether at least one of the service conditions is satisfied by applying a trained model to at least some of the status data, wherein the trained model was trained by:
       for each particular training item of a plurality of training items, adjusting one or more aspects of the trained model based on a comparison of (A) output generated by the trained model for status data of the particular training item to (B) a satisfied or not-satisfied categorization of the particular training item; and
    based on the comparison, causing one or more service actions to be performed.

11. The method of claim 10 wherein the status data associated with one or more dock station components includes, for at least one dock station component, one or more of:
    a total number of uses;
    a number of uses since a last service;
    a total amount of time in use;
    an amount of time in use since the last service; or
    any combination thereof.

12. The method of claim 10 wherein at least some of the status data associated with one or more dock station components is generated based on data gathered by a camera or sensor integrated into at least one of the one or more dock station components.

13. The method of claim 10 wherein the one or more service actions comprise causing a notification to be provided via an application on a mobile device.

14. The method of claim 10 wherein comparing the status data associated with one or more dock station components to one or more service conditions includes determining that an amount of uses of dock station components, specified in the status data associated with one or more dock station components, is at least as large as a service threshold.

15. The method of claim 10 wherein the one or more service actions include one or more of: initiating a maintenance request, initiating a part request, disabling use of a control panel or at least one of the one or more dock station components, or any combination thereof.

* * * * *